United States Patent
Wu et al.

(10) Patent No.: US 11,509,415 B2
(45) Date of Patent: Nov. 22, 2022

(54) CODE BLOCK SEGMENTATION

(71) Applicant: QUALCOMM Incorporated, San Diego, CA (US)

(72) Inventors: Shuanshuan Wu, San Diego, CA (US); Arjun Bharadwaj, Cupertino, CA (US); Kapil Gulati, Hillsborough, NJ (US); Tien Viet Nguyen, Bridgewater, NJ (US); Sudhir Kumar Baghel, Hillsborough, NJ (US); Shailesh Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 160 days.

(21) Appl. No.: 16/811,968

(22) Filed: Mar. 6, 2020

(65) Prior Publication Data
US 2020/0304231 A1  Sep. 24, 2020

Related U.S. Application Data

(60) Provisional application No. 62/822,488, filed on Mar. 22, 2019.

(51) Int. Cl.
*H04L 1/00* (2006.01)
*H04W 72/04* (2009.01)
*H04W 92/18* (2009.01)

(52) U.S. Cl.
CPC ....... *H04L 1/0011* (2013.01); *H04W 72/0446* (2013.01); *H04W 72/0466* (2013.01); *H04W 92/18* (2013.01)

(58) Field of Classification Search
CPC ............ H04L 1/0011; H04W 72/0446; H04W 72/0466

USPC ......................................................... 370/329
See application file for complete search history.

(56) References Cited

U.S. PATENT DOCUMENTS

| | | | | |
|---|---|---|---|---|
| 2020/0296591 A1* | 9/2020 | Alriksson | ............ | H04B 7/0413 |
| 2020/0336274 A1* | 10/2020 | Yoshioka | ............ | H04L 5/0051 |
| 2020/0389873 A1* | 12/2020 | Liu | ............ | H04L 1/1614 |

(Continued)

FOREIGN PATENT DOCUMENTS

| WO | WO-2018136588 A1 | 7/2018 |
|---|---|---|
| WO | WO-2018175420 A1 | 9/2018 |

OTHER PUBLICATIONS

International Search Report and Written Opinion—PCT/US2020/021674—ISA/EPO—dated Jun. 25, 2020.

(Continued)

*Primary Examiner* — Faisal Choudhury
(74) *Attorney, Agent, or Firm* — Loza & Loza, LLP/Qualcomm Incorporated

(57) ABSTRACT

Aspects of the disclosure relate to mechanisms for code block segmentation in a wireless communication network (e.g., a sidelink network). In some examples, a wireless communication device may reserve resources across two or more slots on a carrier for transmission of a transport block. The wireless communication device may then select code block parameters for segmenting the transport block into a plurality of encoded code blocks such that each encoded code bock is fully contained within a single slot. In some examples, the code block parameters may include a number of encoded code blocks and a respective size of each of the encoded code blocks.

30 Claims, 15 Drawing Sheets

(56) References Cited

U.S. PATENT DOCUMENTS

2021/0100036 A1* 4/2021 Kim .................. H04W 74/0833
2021/0127407 A1* 4/2021 Shapin ................. H04L 5/0042

OTHER PUBLICATIONS

Qualcomm Incorporated: "DL Indication Channel Design Principle for URLLC/eMBB Dynamic Multiplexing", 3GPP Draft, 3GPP TSG-RAN WG1 #89, R1-1708637 DL Indication Channel Design Principle for URLLCEMBB Dynamic Multiplexing, 3rd Generation Partnership Project (3GPP), Mobile Competence Centre, 650, Route Des Lucioles, F-0692, vol. RAN WG1, No. Hangzhou, May 15, 2017-May 19, 2017, May 14, 2017 (May 14, 2017), XP051273824, 10 Pages, Retrieved from the Internet: URL:http://www.3gpp.org/ftp/Meetings_3GPP_SYNC/RAN1/Docs/[retrieved on May 14, 2017].

* cited by examiner

CODE BLOCK SEGMENTATION

PRIORITY CLAIM

This application claims priority to and the benefit of Provisional Patent Application No. 62/822,488, entitled "Code Block Segmentation," filed in the U.S. Patent and Trademark Office on Mar. 22, 2019, the entire contents of which are incorporated herein by reference as if fully set forth below in their entirety and for all applicable purposes.

TECHNICAL FIELD

The technology discussed below relates generally to wireless communication networks, and more particularly, to code block segmentation in wireless communication.

INTRODUCTION

In many existing wireless communication systems, a cellular network is implemented by enabling wireless user equipment to communicate with one another through signaling with a nearby base station or cell. As a user equipment moves across the service area, handovers take place such that each user equipment maintains communication with one another via its respective cell.

Another scheme for a wireless communication system is a device-to-device (D2D) network, in which wireless communication devices may signal one another directly, rather than via an intermediary base station or cell. D2D communication networks may utilize direct signaling (e.g., sidelink signaling) to facilitate direct communication between wireless communication devices.

As the demand for sidelink communication increases, research and development continue to advance sidelink technologies. For example, technologies for segmenting code blocks in sidelink communication may be useful, particularly when communicating code blocks over multiple slots.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a method of wireless communication at a first wireless communication device is disclosed. The method includes determining resources on a carrier for communication of a transport block including a packet to a second wireless communication device. The carrier is time-divided into a plurality of slots. The resources include a set of two or more of the plurality of slots. The method further includes selecting code block parameters associated with a plurality of encoded code blocks of the transport block such that each of the plurality of encoded code blocks is fully contained within a respective slot of the set of two or more of the plurality of slots. The code block parameters include a number of the plurality of encoded code blocks and a respective code block size of each of the plurality of encoded code blocks. The method further includes segmenting the transport block into a plurality of code blocks based on the code block parameters, encoding the plurality of code blocks to produce the plurality of encoded code blocks based on the code block parameters, and transmitting the plurality of encoded code blocks over the resources on the carrier to the second wireless communication device.

Another example provides a first wireless communication that includes a processor, a wireless transceiver communicatively coupled to the processor and configured to communicate over a carrier, and a memory communicatively coupled to the processor. The processor and the memory are configured to determine resources on a carrier for communication of a transport block including a packet to a second wireless communication device. The carrier is time-divided into a plurality of slots. The resources include a set of two or more of the plurality of slots. The processor and the memory are further configured to select code block parameters associated with a plurality of encoded code blocks of the transport block such that each of the plurality of encoded code blocks is fully contained within a respective slot of the set of two or more of the plurality of slots. The code block parameters include a number of the plurality of encoded code blocks and a respective code block size of each of the plurality of encoded code blocks. The processor and the memory are further configured to segment the transport block into a plurality of code blocks based on the code block parameters, encode the plurality of code blocks to produce the plurality of encoded code blocks based on the code block parameters, and transmit the plurality of encoded code blocks over the resources on the carrier to the second wireless communication device.

Another example provides a method of wireless communication at a first wireless communication device. The method includes receiving a transport block including a packet transmitted from a second wireless communication device over a carrier. The carrier is time-divided into a plurality of slots. The transport block is received within resources over a set of two or more of the plurality of slots. The method further includes selecting code block parameters associated with a plurality of encoded code blocks of the transport block. The code block parameters include a number of the plurality of encoded code blocks and a respective code block size of each of the plurality of encoded code blocks such that each of the plurality of encoded code blocks is fully contained within a respective slot of the set of two or more of the plurality of slots. The method further includes segmenting the transport block into the plurality of encoded code blocks based on the code block parameters, and decoding the plurality of encoded code blocks based on the code block parameters to produce the packet.

Another example provides a first wireless communication that includes a processor, a wireless transceiver communicatively coupled to the processor and configured to communicate over a carrier, and a memory communicatively coupled to the processor. The processor and the memory are configured to receive a transport block including a packet transmitted from a second wireless communication device over a carrier. The carrier is time-divided into a plurality of slots. The transport block is received within resources over a set of two or more of the plurality of slots. The processor and the memory are further configured to select code block parameters associated with a plurality of encoded code blocks of the transport block. The code block parameters include a number of the plurality of encoded code blocks and a respective code block size of each of the plurality of encoded code blocks such that each of the plurality of encoded code blocks is fully contained within a respective slot of the set of two or more of the plurality of slots. The processor and the memory are further configured to segment the transport block into the plurality of encoded code blocks based on the code block parameters, and decode the plurality of encoded code blocks based on the code block parameters to produce the packet.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
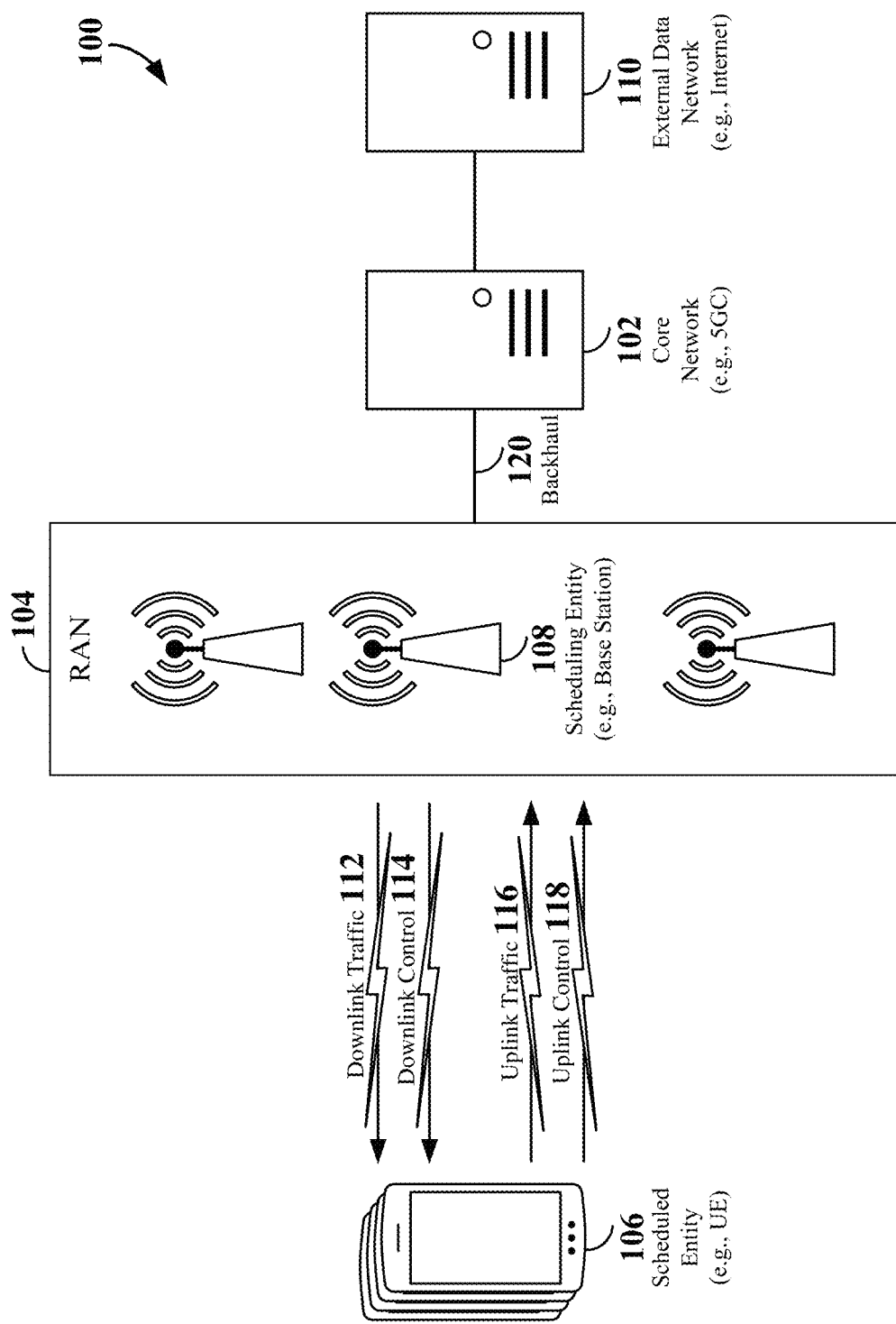
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Various aspects of the disclosure relate to mechanisms for code block segmentation in a wireless communication network. In some examples, the wireless communication network may be a sidelink network. In some examples, a wireless communication device may reserve resources on a carrier for transmission of a transport block. The reserved resources may span two or more consecutive or non-consecutive slots. The wireless communication device may select code block parameters for segmenting the transport block into a plurality of encoded code blocks such that each encoded code bock is fully contained within a single slot. In some examples, the code block parameters may include a number of encoded code blocks and a respective size of each of the encoded code blocks. Based on the code block parameters, the wireless communication device may segment the transport block into code blocks and encode the code blocks to produce the plurality of encoded code blocks.

In some examples, the code block parameters may be selected based on the transport block size (TBS) of the transport block and resource parameters associated with the resources reserved for communication of the transport block. For example, the resource parameters may indicate the number of slots included in the reserved resources, along with the number of available symbols or available resource elements (REs) within each slot. In an example, the code block parameters may be selected based the number of bits of the transport block that may be included in each slot. For example, the number of bits of the transport block to include in each slot may be calculated based on the code rate, modulation order and number of resource elements available within the slot. In this example, the size and number of encoded code blocks in each slot may be the same or different. As another example, the number of bits of the transport block to include in each slot may be calculated based on the TBS and the number of slots. In this example, the size and number of encoded code blocks in each slot are the same. In either of the above examples, the respective sizes of the encoded code blocks within the same slot are the same.

In some examples, the receiving wireless communication device may generate and transmit acknowledgement information (e.g., acknowledgement or negative acknowledgement) for each encoded code block or for each slot. In examples in which the acknowledgement information is generated for each encoded code block, the transmitting wireless communication device may retransmit those encoded code blocks for which a negative acknowledgement is received. In examples in which the acknowledgement information is generated for each slot, the transmitting wireless communication device may retransmit all of the encoded code blocks within each slot for which a negative acknowledgement is received.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable radio access technology (RAT) or RATs to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. In another example, the RAN 104 may operate according to both the LTE and 5G NR standards. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology. In examples where the RAN 104 operates according to both the LTE and 5G NR standards, one of the base stations 108 may be an LTE base station, while another base station may be a 5G NR base station.

The radio access network 104 is further illustrated supporting wireless communication for multiple mobile apparatuses. A mobile apparatus may be referred to as user equipment (UE) 106 in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE 106 may be an apparatus that provides a user with access to network services. In examples where the RAN 104 operates according to both the LTE and 5G NR standards, the UE 106 may be an Evolved-Universal Terrestrial Radio Access Network-New Radio dual connectivity (EN-DC) UE that is capable of simultaneously connecting to an LTE base station and a NR base station to receive data packets from both the LTE base station and the NR base station.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
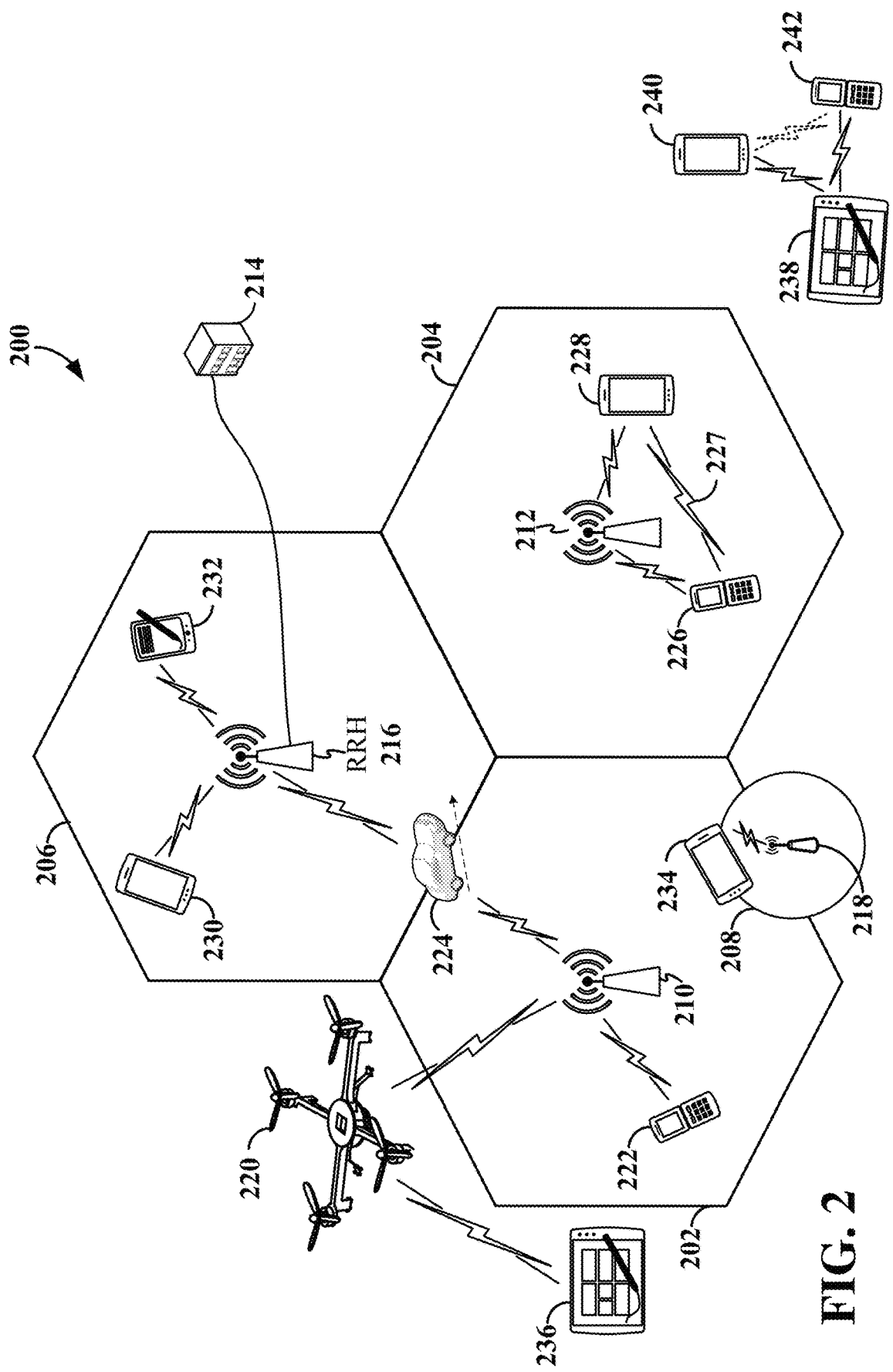
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 238, 240, and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources. In some examples, the sidelink signals 227 include sidelink traffic and sidelink control.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into encoded code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In early 5G NR specifications, user data traffic is coded using quasi-cyclic low-density parity check (LDPC) with two different base graphs: one base graph is used for large code blocks and/or high code rates, while the other base graph is used otherwise. Control information and the physical broadcast channel (PBCH) are coded using polar coding, based on nested sequences. For these channels, puncturing, shortening, and repetition are used for rate-matching.

However, those of ordinary skill in the art will understand that aspects of the present disclosure may be implemented utilizing any suitable channel code. Various implementations of scheduling entities 108 and scheduled entities 106 may include suitable hardware and capabilities (e.g., an encoder, a decoder, and/or a CODEC) to utilize one or more of these channel codes for wireless communication.

However, even with the best error correcting codes, if the communication channel experiences a very large amount of noise, or experiences a deep fade or other issue, the bit error rate may exceed what can be compensated. Accordingly, many wireless communication networks utilize a hybrid automatic repeat request (HARQ) scheme to further improve data reliability. In a HARQ algorithm, the transmitting device (e.g., a base station or UE) may retransmit code blocks (e.g., encoded using convolutional or block codes) if the first transmission is not decoded correctly at the receiving device. To facilitate this process, a transmitted encoded code block may include a cyclic redundancy check (CRC) portion, a checksum, or any other suitable mechanism known to those of ordinary skill in the art to determine whether the encoded code block is decoded properly at the receiving device. If the received encoded code block is properly decoded, then the receiving device may transmit an acknowledgment (ACK), informing the transmitting device that a retransmission is not needed. However, if the received encoded code block is not properly decoded, then the receiving device may transmit a negative acknowledgment (NACK) requesting a retransmission. In general, a limited number of retransmissions will be made before the transmission attempt is terminated. Many existing networks limit their HARQ algorithms to four retransmissions. However, any suitable retransmission limit may be utilized in a network within the scope of the present disclosure.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
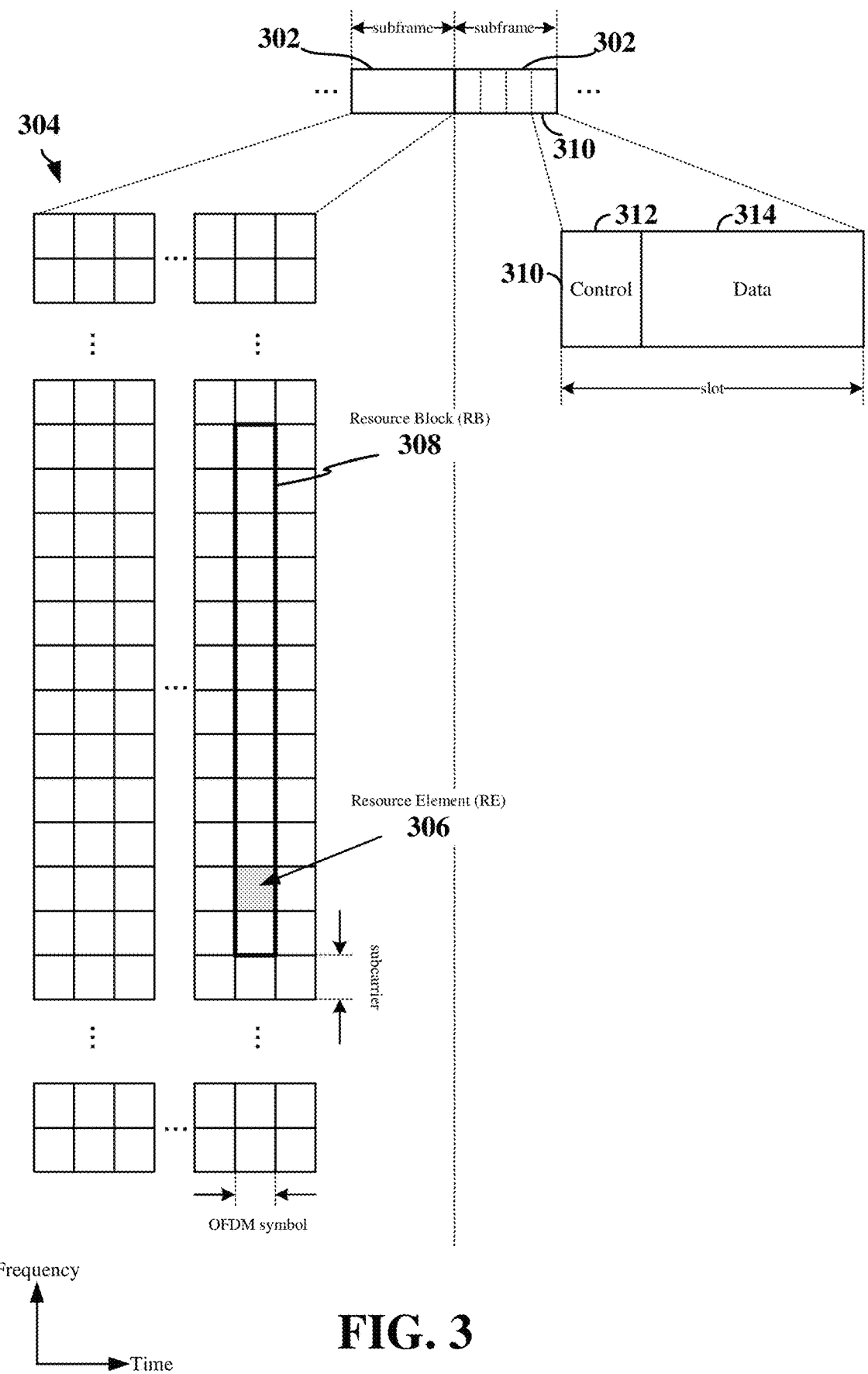
FIG. 3 is a schematic diagram illustrating organization of wireless resources in an air interface utilizing orthogonal frequency divisional multiplexing (OFDM) according to some aspects.

Referring now to FIG. 3, an expanded view of an exemplary subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

Scheduling of UEs for downlink, uplink, or sidelink transmissions typically involves scheduling one or more resource elements 306 within one or more sub-bands. Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one to three OFDM symbols). These mini-slots may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In some examples, the slot 310 may be utilized for broadcast or unicast communication. In an example of a sidelink wireless communication network, a broadcast communication may refer to a point-to-multipoint transmission by one sidelink device (e.g., a UE) to other sidelink devices (e.g., UEs). A unicast communication may refer to a point-to-point transmission by one sidelink device to a single other sidelink device.

In addition, within a sidelink network, the control region 312 of the slot 310 may include sidelink control information transmitted by a transmitting sidelink device towards a set of one or more receiving sidelink devices nearby the transmitting sidelink device. In some examples, the sidelink control information may include synchronization information to synchronize communication by a plurality of sidelink devices on the sidelink channel. In addition, the sidelink control information may include scheduling information indicating one or more resource blocks within the data region 314 of the slot 310 reserved by the transmitting sidelink device to transmit sidelink data to the set of one or more receiving sidelink devices. For example, the control region 312 of the slot 310 may include the scheduling information, while the data region 314 of the slot 310 may include sidelink data transmitted in accordance with the scheduling information. The scheduling information may further relate to an expected subsequent transmission in a later slot and/or to a transmission spanning multiple slots. For example, the sidelink device may reserve resource blocks across multiple slots for a large transmission. By reserving resources for a subsequent transmission, another nearby sidelink device may refrain from using the same (or overlapping) resources to avoid interfering with the expected transmission. In some examples, the scheduling information may further include information related to the data, such as a modulation and coding scheme utilized for the data. In some examples, the control information may be transmitted within a physical sidelink control channel (PSCCH), while the data may be transmitted within a physical sidelink shared channel (PSSCH).

The channels or carriers illustrated in FIG. 3 are not necessarily all of the channels or carriers that may be utilized between sidelink devices, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Figure 4:
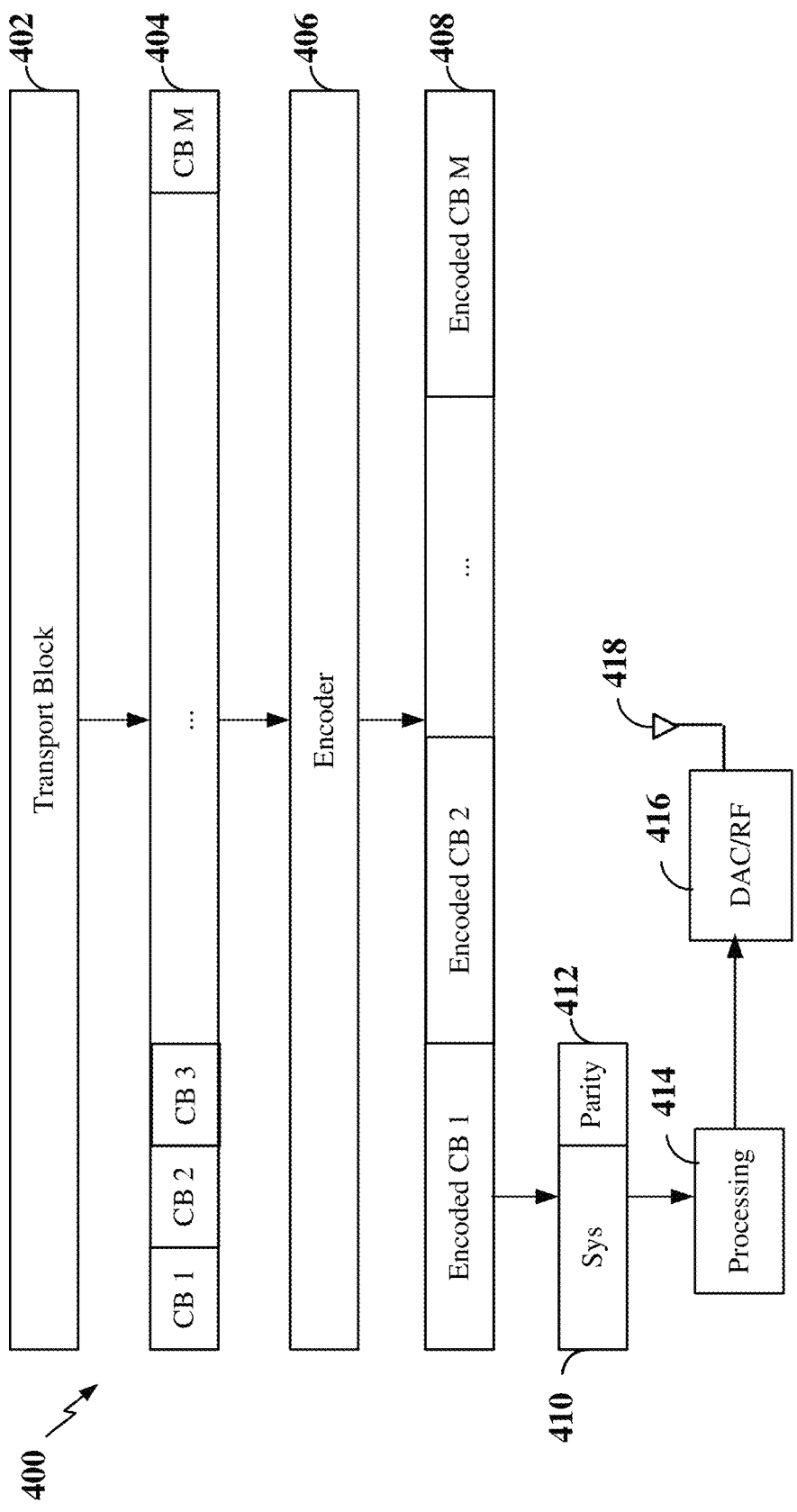
FIG. 4 illustrates an example of a slot that may be utilized to communicate over a carrier according to some aspects.

FIG. 4 is a conceptual diagram illustrating a transmitting wireless communication device 400 configured to transmit a transport block 402. The transmitting wireless communication device 400 may correspond to, for example, one of the sidelink devices 238, 240, or 242 scheduled entity 108 shown in FIG. 2.

The transport block 402 may include a packet, such as an Internet Protocol (IP) packet, a radio link control (RLC) protocol data unit (PDU), or a medium access control (MAC) PDU. The transmitting wireless communication device 400 may be configured to segment the transport block 402 into M code blocks 404, each including a plurality of information bits (systematic bits), corresponding to a portion of the packet.

Each of the code blocks 404 may then be encoded by a block encoder 406 to produce M encoded code blocks 408, each corresponding to a respective one of the code blocks 404. Each encoded code block 408 includes systematic (information) bits 410 and parity (redundancy) bits 412. For example, each of the code blocks 404 may have a length of K information bits 410. The block encoder 406 may then mathematically add redundancy (e.g., parity bits 412) to each code block 404, resulting in codewords or encoded code blocks 408, each having a length of N, where N>K. Here, the code rate R is the ratio between the code block length and the encoded code block length: i.e., R=K/N. Thus, with block codes, the information bits are transmitted together with the parity bits. The block encoder 406 may, in some examples, be an LDPC encoder or a polar encoder.

Further processing (e.g., modulation, tone mapping, etc.) may then performed on the encoded code blocks 408 by processing block 414 before being input to a digital-to-analog converter (DAC)/radio frequency (RF) block 416 for analog conversion and up-conversion of the analog signal to RF. The RF signal may then be transmitted via an antenna 418 (or antenna array).

In some examples, the transport block 402 may be transmitted over resources (e.g., REs) reserved within a single slot for the transmission. In other examples, where the TBS exceeds the resources available within a single slot, the transport block 402 may be transmitted across two or more slots. The transmission of a transport block 402 (or portion thereof) over multiple (two or more) slots is referred to herein as slot aggregation. In some cases, not only is the TBS too large for transmission within the reserved resources for a single slot, but the code block size may also be too large for transmission within the reserved resources for a single slot. In this example, slot aggregation may further be applied to encoded code blocks 408, such that a single encoded code block 408 may span multiple (two or more) slots. In examples in which a transport block 402 is not segmented into code blocks prior to coding (e.g., the transport block 402 includes a single encoded code block 408), it may be considered that slot aggregation is applied at the transport block level or the code block level.

As a result of the distributed medium access in sidelink wireless communications, variations may occur in the noise and interference levels from slot to slot. Therefore, the decoding failure rate may vary between slots, thus resulting in inefficient retransmissions when the code block is transmitted across multiple slots. For example, if a code block is transmitted across two slots, but decoding fails in only one of the slots used in slot aggregation, the entire code block is retransmitted across one or more additional slots (depending on the granted resources for the retransmission).

Figure 5:
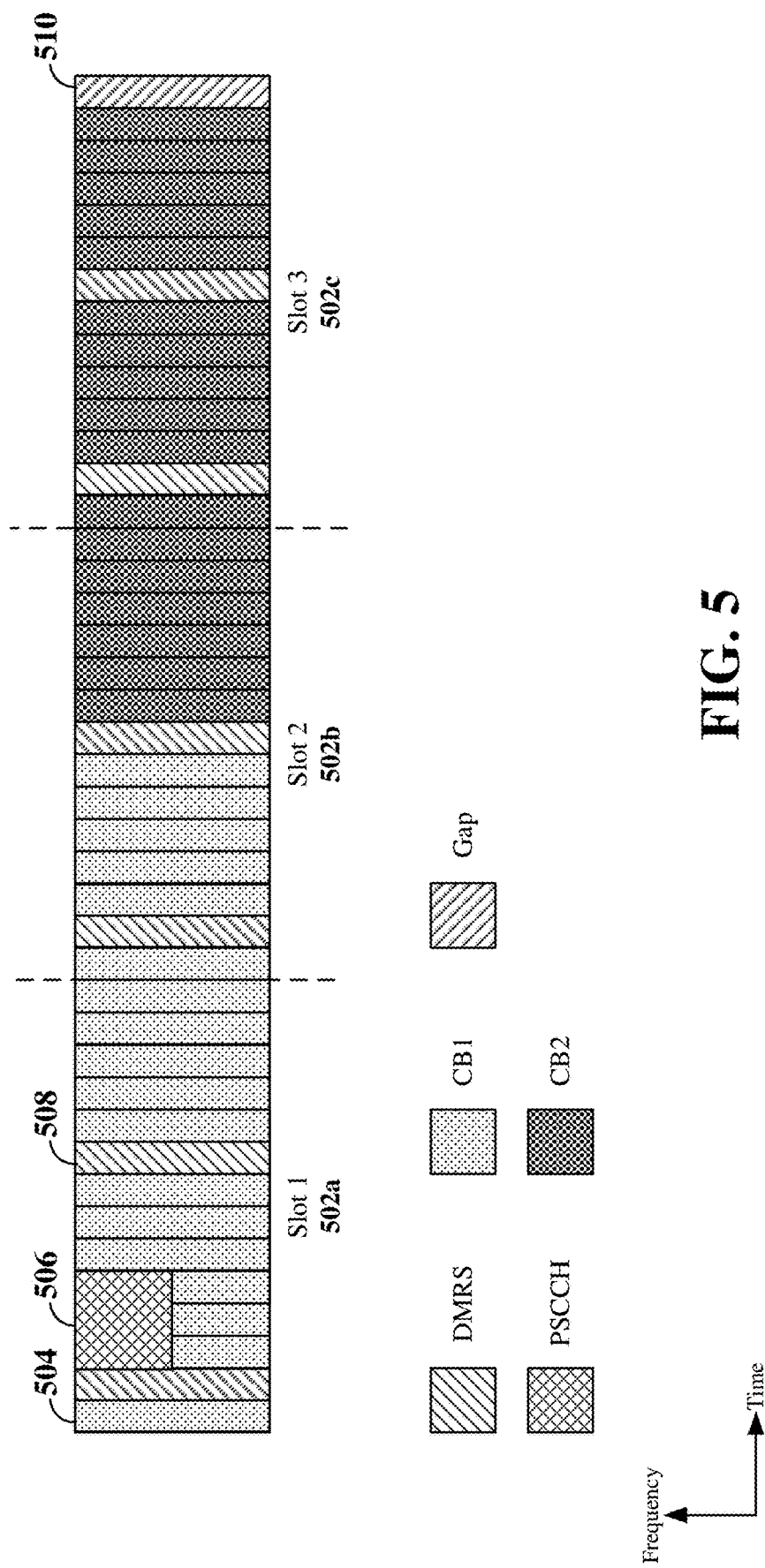
FIG. 5 illustrates an example of transport block (TB) and code block (CB) slot aggregation according to some aspects.

FIG. 5 illustrates an example of transport block (TB) and code block (CB) slot aggregation. In the example shown in FIG. 5, a carrier, such as a sidelink carrier, is shown time-divided into a plurality of slots, three of which 502a (Slot 1), 502b (Slot 2), and 502c (Slot 3), are illustrated for convenience. Here, time is illustrated along the horizontal axis, while frequency is illustrated along the vertical axis. Each slot 502a, 502b, and 502c includes 14 OFDM symbols 504, and each OFDM symbol 504 may include any suitable number of RBs. In an example, each OFDM symbol 504 may include 20 RBs.

If the TBS of a TB to be transmitted by a transmitting wireless communication device (e.g., a transmitting sidelink device) over the carrier exceeds the available resources within a single slot, the transmitting sidelink device may reserve resources across multiple slots. For example, the transmitting sidelink device may reserve the available resources within each of the slots 502a, 502b, and 502c for transmission of a TB. The available resources within a slot for transmission of a TB (e.g., a PSSCH) include all of the REs within a slot excluding those REs reserved for the transmission of control information 506 (e.g., a PSCCH) or pilot signals 508 (e.g., a DMRS) or other unavailable REs 510 (e.g., a gap). A gap 510 may be provided at the end of a transmission (e.g., the end of the TB transmission) to provide a time separation between the end of one transmission and the beginning of another transmission. Unavailable REs may also be REs that are reserved or assigned for other purposes (e.g., for sidelink feedback information).

In the example shown in FIG. 5, a DMRS may be transmitted by the transmitting sidelink device in the second and eighth OFDM symbols in each slot 502a, 502b, and 502c to assist the receiving sidelink device in performing channel estimation to enable coherent demodulation/detection of the control and/or data channel (e.g., PSCCH and/or PSSCH). In addition, at least a portion of the third, fourth, and fifth OFDM symbols in Slot 1 502a are reserved for control information (e.g., a PSCCH). In other examples, one or more complete OFDM symbols or portions thereof may be reserved for control information. In addition, the control information may be transmitted in just one of the slots reserved for a TB, as shown in FIG. 5, or within each of the reserved slots 502a, 502b, and 502c.

In the example shown in FIG. 5, the TB is segmented into two equal CBs (e.g., CB1 and CB2). However, since the reserved resources span three slots, each of the CBs is transmitted across two of the slots. Here, each CB may correspond to an encoded CB. For example, CB1 is shown transmitted across Slot 1 502a and a beginning portion of Slot 2 502b (e.g., through the seventh OFDM symbol of Slot 2), whereas CB2 is shown transmitted across the remainder of Slot 2 502b (e.g., starting in the ninth OFDM symbol of Slot 2) and Slot 3 502c.

In an example, assuming a modulation and coding scheme (MCS) index of 4 (e.g., QPSK and a code rate of 602/1024) and a total number of available bits in the aggregated slots (e.g., the number of bits associated with the available resources in each of the slots 502a, 502b, and 502c) of 17,520, the transmitting sidelink device may determine that the TBS of the TB is 10,248 bits. In some examples, the number of available bits in the aggregated slots may be determined based on the modulation order ($Q_o$), the number of transmission streams, and the number of available REs in the aggregated slots.

The transmitting sidelink device may then segment the TB into two CBs, each of size 5,160 and each including 24 CRC bits (excluding filler bits). The transmitting sidelink device may then map CB1 and CB2 to RBs in the slots 502a, 502b, and 502c using a frequency-first mapping scheme (e.g., mapping modulation symbols of the CBs to the RBs from sub-carrier to sub-carrier) or a time-first mapping scheme (e.g., mapping modulation symbols of the CBs to the RBs from OFDM symbol to OFDM symbol). In this example, if reception of Slot 2 502b fails at the receiving sidelink device (e.g., the receiving sidelink device is unable to detect/decode the CBs received in Slot 2), decoding of both CB1 and CB2 may fail, thus resulting in retransmission of the entire TB.

Figure 6:
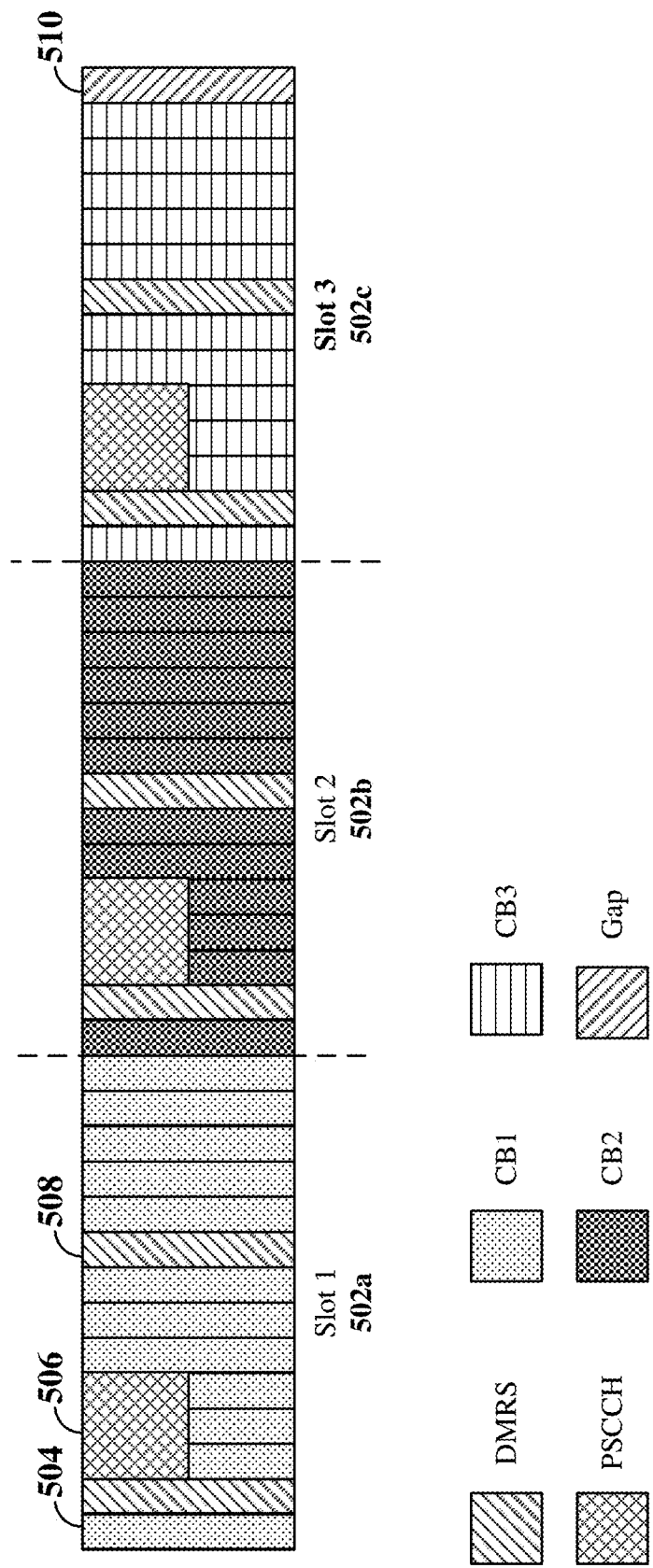
FIG. 6 illustrates an example of CB segmentation for TB slot aggregation according to some aspects.

To improve the retransmission efficiency and overall system performance, as shown in FIG. 6, a TB may be segmented such that each of the CBs is fully contained within a single slot (e.g., none of the CBs span two or more slots). Therefore, CB error is reduced when reception/decoding failure occurs in less than all of the slots utilized in slot aggregation. In the example shown in FIG. 6, instead of segmenting the TB into two CBs, the transmitting sidelink device may segment the TB into three CBs (CB1, CB2, and CB3) and map each of the CBs to the available REs in a single slot. For example, CB1 may be mapped to the available REs within Slot 1 502a, CB2 may be mapped to the available REs within Slot 2 502c, and CB3 may be mapped to the available REs within Slot 3 502c.

In order to segment the TB into single-slot CBs, the transmitting sidelink device may select code block parameters for the TB indicating the number of CBs and the size of each CB. The code block parameters may be selected based on the TBS of the TB and resource parameters associated with the resources reserved for communication of the TB. For example, the resource parameters may indicate the number of slots included in the reserved resources, along with the amount of available resources (e.g., the number of available symbols or REs) in each slot. In the example shown in FIG. 6, the amount of available resources in Slots 2 and 3 is reduced as compared to the example shown in FIG. 5 due to the inclusion of control information 506 (e.g., PSCCH) in each of Slots 2 and 3. However, it should be understood that the inclusion of control information in second and/or any other subsequent slots utilized in slot aggregation is optional.

Figure 7:
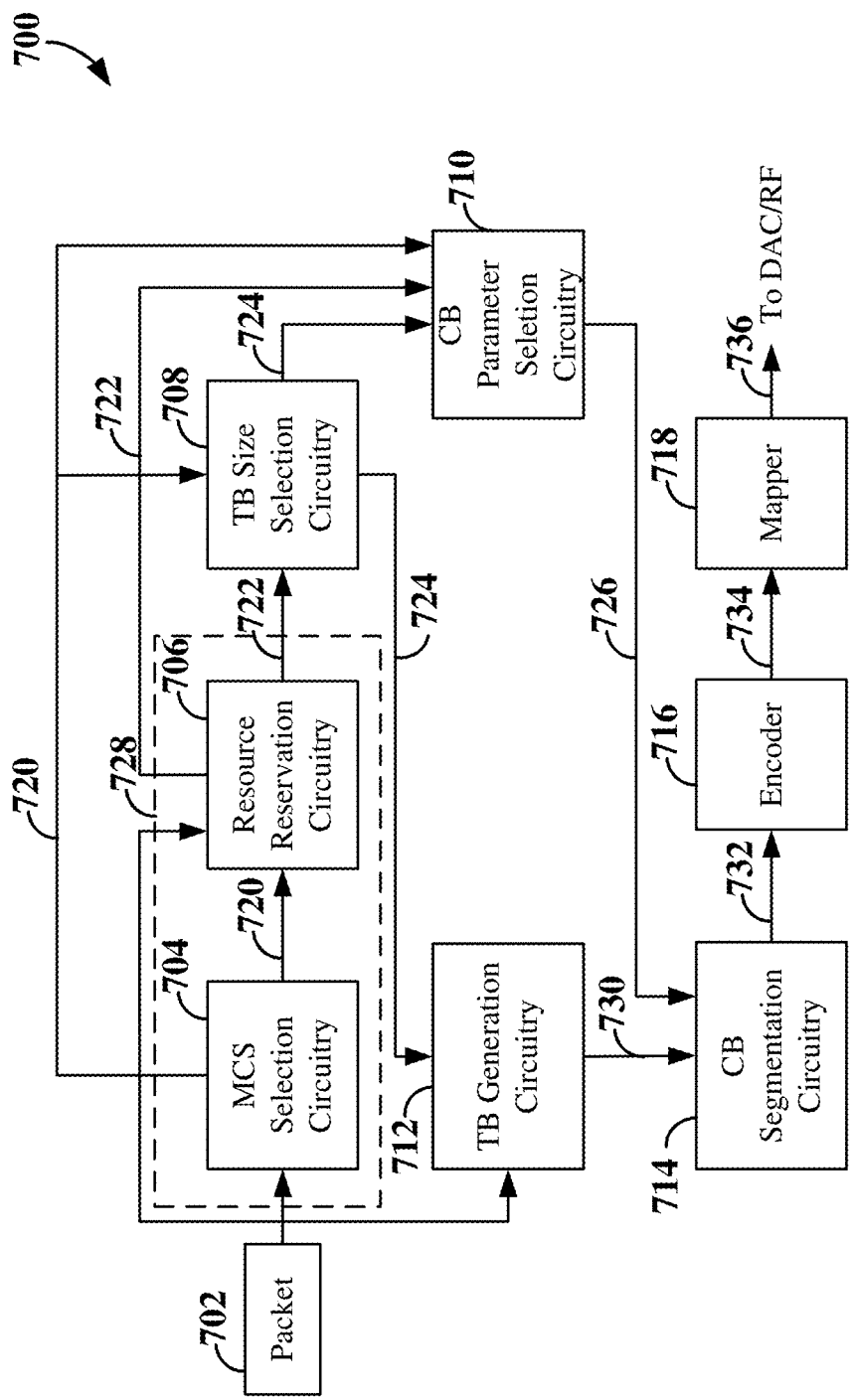
FIG. 7 is a block diagram illustrating an example of processing circuitry within a transmitting wireless communication device according to some aspects.

FIG. 7 is a block diagram illustrating an example of processing circuitry 700 within a transmitting wireless communication device (e.g., a transmitting sidelink device) configured to segment a TB into a plurality (e.g., two or more) single-slot CBs for transmission over a sidelink carrier utilizing slot aggregation. The processing circuitry 700 includes MCS selection circuitry 704, resource reservation circuitry 706, TB size selection circuitry 708, CB parameter selection circuitry 710, TB generation circuitry 712, CB segmentation circuitry 714, an encoder 716, and a mapper 718.

The MCS selection circuitry 704 is configured to receive a packet 702 for transmission to a receiving sidelink device and to select a MCS 720 for the packet 702. The packet may include, for example, an IP packet, an RLC packet, a MAC packet or other suitable type of packet. The MCS 720 indicates the modulation order (e.g., QPSK, 16 QAM, 64 QAM, or 256 QAM) and code rate to be used for encoding the packet.

The resource reservation circuitry 706 is configured to reserve resources across two or more slots for transmission of the packet 702 based on, for example, the packet size and the MCS 720. In some examples, the slots included in the reserved resources may be consecutive or non-consecutive in time. In addition, the frequency bandwidth (e.g., number of RBs) within each slot may be the same or may vary between slots.

The resource reservation circuitry 706 is further configured to generate resource parameters 722 indicating, for example, the number of slots included in the reserved resources, along with an amount of available resources (e.g., the number of available symbols or REs) in each slot for transmission of a PSSCH including the packet 702. As described above, the amount of available resources in each slot may include all of the REs within the slot excluding those REs reserved for the transmission of control information (e.g., a PSCCH) or pilot signals (e.g., a DMRS) or other unavailable REs (e.g., a gap). The resource parameters 722 may further indicate a number of transmission streams selected for transmission of the packet 702. In some examples, the MCS selection circuitry 704 and resource reservation circuitry 706 may be included in higher layer processing circuitry 728, whereas the remaining circuitry may form part of the physical layer processing circuitry.

The TB size selection circuitry 708 is configured to determine the size of a transport block (e.g., the TBS 724) carrying the packet 702. The TB size selection circuitry 708 may determine the TBS 724 based on, for example, the selected MCS 720, along with the number of transmission streams and the number of available symbols or REs indicated in the resource parameters 722. In an example, the TB size selection circuitry 708 may be configured to determine a total number of bits available for transmission in the aggregated slots (reserved resources) $N_{info}$ from the modulation order $Q_o$ (indicated by the selected MCS 720), the number of transmission streams, and a total number of available REs across the aggregated slots. The TB size selection circuitry 708 may then be configured to determine the TBS 724 from $N_{info}$.

The CB parameter selection circuitry 710 is configured to select CB parameters 726 for segmenting a TB including the packet into a plurality of CBs (prior to encoding). The CB parameters 726 may indicate, for example, the number of encoded CBs and the size of each encoded CB. The CB parameters 726 may be selected based on at least the TBS 724 of the TB carrying the packet 702 and the resource parameters 722. In some examples, the CB parameters 726 may further be selected based on the selected MCS 720.

In some examples, the CB parameter selection circuitry 710 may be configured to determine the number of bits of the TB that may be transmitted in each slot of the reserved resources. For example, for the l-th slot of the reserved resources, the CB parameter selection circuitry 710 may determine the number of bits ($N_{info,l}$) that may be transmitted in that slot. The CB parameter selection circuitry 710 may then be configured to select the CB parameters from the $N_{info,l}$ based on a predefined rule. In some examples, the predefined rule may include identifying a respective LDPC base graph to utilize for each slot and then determining the number of encoded CBs and the size of each encoded CB in each slot utilizing $N_{info,l}$.

In an example, the CB parameter selection circuitry 710 may be configured to determine the $N_{info,l}$ based on the code rate (R), a modulation order ($Q_o$), and the amount of available REs ($N_{RE,l}$) in the slot. For example, $N_{info,l}$ may be calculated as:

$$N_{info,l} = R \times Q_o \times N_{RE,l} \quad \text{(Equation 1)}$$

The code rate (R) may be determined from the MCS, or may be calculated as $(N_{TB}+N_{CRC,TB})/(Q_o \times N_{RE,l})$, where $N_{TB}$ is the transport block size (TBS), $N_{CRC,TB}$ is the size of the cyclic redundancy check (CRC) appended to the TB. For example, $N_{CRC,TB}$ may be 24 bits. In some examples, the modulation order $Q_o$ may be 2 for QPSK, 4 for 16QAM, 6 for 64QAM and 8 for 256QAM.

In this example, each slot may include one or more encoded CBs. If there are multiple encoded CBs in a slot, each encoded CB in the slot may have the same size. However, the size of encoded CBs may vary between slots. For example, the size of encoded CBs in one slot may be different from the size of encoded CBs in another slot of the reserved resources. In addition, the number of encoded CBs in each slot may vary between slots. For example, the number of encoded CBs in one slot may be different from the number of encoded CBs in another slot of the reserved resources.

For example, assuming again that the total available bits in the reserved resources is 17,520, the TBS is 10,248 and the CRC size is 24 bits, the code rate may be determined as (10,248+24)/17,520. In addition, assuming the modulation order is 2 (e.g., $Q_o=2$) and there are three aggregated slots in the reserved resources with $N_{RE,1}=2,760$, $N_{RE,2}=3,120$, and $N_{RE,3}=2,880$, the number of bits of the TB that may be transmitted in each slot ($N_{info,l}$) may be calculated based on the above Equation 1. In some examples, the calculated $N_{info,l}$ may not be an integer value. In this case, the calculated $N_{info,l}$ may either be rounded or ceiled to the nearest integer or rounded or ceiled to the nearest integer divisible by eight. For example, the calculated $N_{info,l}$ may be: $N_{info,1}=3,240$, $N_{info,2}=3,664$, and $N_{info,3}=3,384$. However, the total number of bits calculated using rounding/ceiling (e.g., 10,288) may exceed the sum of the TBS and CRC size (e.g., 10,272). In this case, the size of one of the encoded CBs may be reduced. For example, the size of the last encoded CB may be reduced. It should be understood that for larger TBs, in which one slot may include multiple encoded CBs, the calculated $N_{info,l}$ for each slot may be divided equally into the number of encoded CBs in that slot. In some examples, the encoded CB size may be byte-aligned.

In another example, the CB parameter selection circuitry 710 may be configured to determine the $N_{info,l}$ based on the TBS and the number of slots. For example, $N_{info,l}$ may be calculated as:

$$N_{info,l} = (N_{TB}+N_{CRC,TB})/n_{slot}, \quad \text{(Equation 2)}$$

where $n_{slot}$ is the number of slots in the reserved resources. In this example, each slot may include one or more encoded CBs. If there are multiple encoded CBs in a slot, each encoded CB in the slot may have the same size. In addition, the size of encoded CBs in each slot may be the same and the number of encoded CBs in each slot may be the same. Thus, in this example, the TB is segmented into equal CBs (prior to encoding). However, since the number of available REs may vary between slots, the code rate utilized in each slot may be different.

For example, assuming that the total available bits in the reserved resources is 16,080, the TBS is 9,480 and the CRC size is 24 bits, and there are three aggregated slots in the reserved resources, the number of bits that may be transmitted in each slot ($N_{info,l}$) may be calculated based on the above Equation 2. With uniform partition, the calculated $N_{info,l}$ may be $N_{info,1}=N_{info,2}=N_{info,3}=3,168$.

The TB generation circuitry 712 is configured to generate a TB 730 including the packet 702 based on the TBS 724 indicated by the TB size selection circuitry 708. The TB generation circuitry 712 may then output the TB 730 to the CB segmentation circuitry 714 for segmentation of the TB 730 into a plurality of CBs 732, where each CB 732 corresponds to a CB prior to encoding. The CB segmentation circuitry 714 may be configured to segment the TB 730 into the plurality of CBs 732 based on the CB parameters 726 selected by the CB parameter selection circuitry 710. For example, the CB parameters 726 may indicate the number of encoded CBs and the size of each encoded CB.

The encoder 716 is configured to encode each of the CBs 732 utilizing a respective coding scheme to produce the plurality of encoded CBs 734, each corresponding to an encoded one of the CBs. In some examples, the encoder 716 may encode each of the CBs 732 utilizing LDPC coding. In addition, the encoder 716 may encode the CBs 732 based on the code rate specified in the MCS 720 or may modify the code rate in one or more slots based on the resource parameters 722 (e.g., the number of available REs in each slot) and the size of the CB(s) 732 in each slot. In some examples, the encoder 716 may further be configured to perform rate-matching to produce the encoded CBs 734 such that the encoded CBs 734 are rate-matched according to the actual number of available REs in each slot. Thus, in this example, one or more of the encoded CBs 734 may be a rate-matched encoded CB 734.

Using the above example of three aggregated slots in the reserved resources and one encoded CB per slot with $N_{info,1}=3,240$, $N_{info,2}=3,664$, and $N_{info,3}=3,384$, after LDPC coding, the encoded CB sizes may be as follows: $CB_1=3,264$, $CB_2=3,668$, and $CB_3=3,408$ (including 24 CRC bits, excluding filler bits). In this example, the size of $CB_3$ may have originally been 3,492 bits, but after size-reduction of the encoded CB to ensure the TB fits within the three encoded CBs, the size of $CB_3$ may be 3,408. Using the above example of three aggregated slots in the reserved resources with one encoded CB per slot with $N_{info,1}=N_{info,2}=N_{info,3}=3,168$, after LDPC coding, each encoded CB may have a size of 3,192 (including 24 CRC bits, excluding filler bits).

The mapper 718 may be configured to map the encoded bits to modulation symbols using a particular modulation scheme (e.g., QPSK, 16QAM, 64QAM, etc.). For example, the mapper 718 may map the encoded bits to modulation symbols based on the modulation order specified in the MCS 720. The mapper 718 may further map the modulation symbols onto the subcarriers in the reserved resources to produce modulated subcarriers 736. In some example, the mapper 718 may map the modulation symbols onto the subcarriers using either a time-first mapping scheme or a frequency-first mapping scheme. The modulated subcarriers 736 may then be output to a digital-to-analog converter (DAC)/radio frequency (RF) block (not shown) for analog conversion and up-conversion of the analog signals to RF signal.

Figure 8:
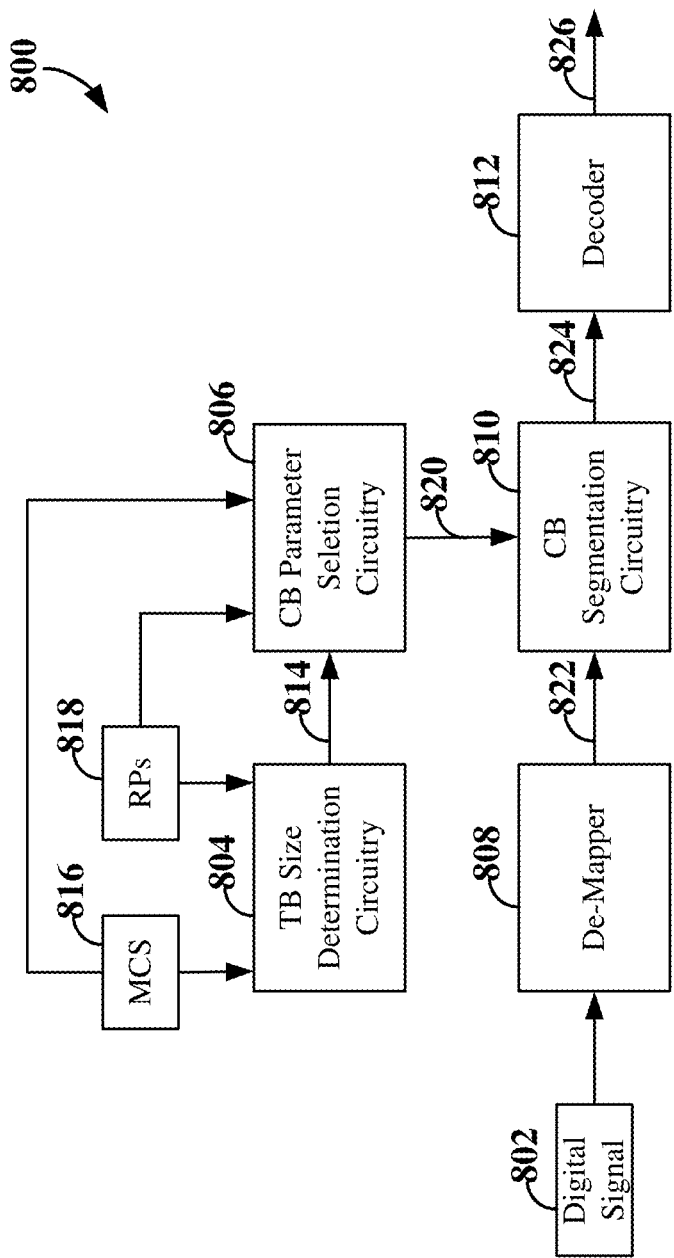
FIG. 8 is a block diagram illustrating an example of processing circuitry within a receiving wireless communication device according to some aspects.

FIG. 8 is a block diagram illustrating an example of processing circuitry 800 within a receiving wireless communication device (e.g., a receiving sidelink device) configured to receive a digital signal 802 corresponding to a TB that has been segmented into a plurality (e.g., two or more) of single-slot CBs. The processing circuitry 800 includes TB size determination circuitry 804, CB parameter selection circuitry 806, a de-mapper 808, CB segmentation circuitry 810, and a decoder 811.

The TB size determination circuitry 804 is configured to determine the transport block size (TBS) 814 of the TB received over multiple slots (e.g., a set of two or more slots). The TB size determination circuitry 804 may be configured to determine the TBS 814 based on the modulation and coding scheme (MCS) 816 utilized to encode the TB and resource parameters (RPs) 818. The RPs 818 may indicate, for example, the number of slots in the reserved resources for the TB and the amount of available resources (e.g., the number of available symbols or REs) in each slot available for reception of the TB. The MCS 816 and RPs 818 may be determined, for example, from control information received from the transmitting wireless communication device (e.g., transmitting sidelink device).

The CB parameter selection circuitry 806 is configured to select CB parameters 820 utilized by the transmitting sidelink device in segmenting the TB into a plurality of CBs. The CB parameters 820 may indicate, for example, the number of encoded CBs and the size of each encoded CB (e.g., the number of coded bits). The CB parameters 820 may be selected based on at least the TBS 814 and the RPs 818. In some examples, the CB parameters 820 may further be selected based on the selected MCS 816.

In some examples, the CB parameter selection circuitry 806 may be configured to determine the number of bits of the TB transmitted in each slot of the reserved resources. For example, for the l-th slot of the reserved resources, the CB parameter selection circuitry 806 may determine the number of bits ($N_{info,l}$) transmitted in that slot. In an example, the CB parameter selection circuitry 806 may determine $N_{info,l}$ using any one or more of the procedures described above in connection with the CB parameter selection circuitry 710 of FIG. 7. The particular procedure to utilize in determining $N_{info,l}$ may be preconfigured on the receiving sidelink device or may be included in the control information received from the transmitting sidelink device. The CB parameter selection circuitry 806 may then be configured to select the CB parameters from the $N_{info,l}$ based on a predefined rule. In some examples, the predefined rule may include identifying a respective LDPC base graph to utilize for each slot and then determining the number of encoded CBs and the size of each encoded CB in each slot utilizing $N_{info,l}$.

The de-mapper 808 is configured to receive the digital signal 802 (e.g., from an RF block/ADC) and, after transformation of the digital signal 802 to a frequency domain signal (not shown), to perform subcarrier de-mapping to produce a plurality of modulation symbols. The de-mapper 808 is further configured to demodulate the modulation symbols to recover the encoded bits (e.g., the TB 822).

The CB segmentation circuitry 810 is configured to receive the TB 822 and to segment the TB 822 into a plurality of encoded CBs 824. The CB segmentation circuitry 810 may be configured to segment the TB 822 based on the CB parameters 820 selected by the CB parameter selection circuitry 806. For example, the CB parameters 820 may indicate the number of encoded CBs and the size of each encoded CB.

The decoder 812 is configured to receive the plurality of encoded CBs 824 and to decode each of the encoded CBs 824 to produce the original packet 826. The original packet 826 may then be output by the decoder 812 for further processing. In some examples, the decoder 812 may decode each of the encoded CBs 824 utilizing LDPC coding. In addition, the decoder 812 may decode the encoded CBs 824 based on the code rate specified in the MCS 816.

Figure 9:
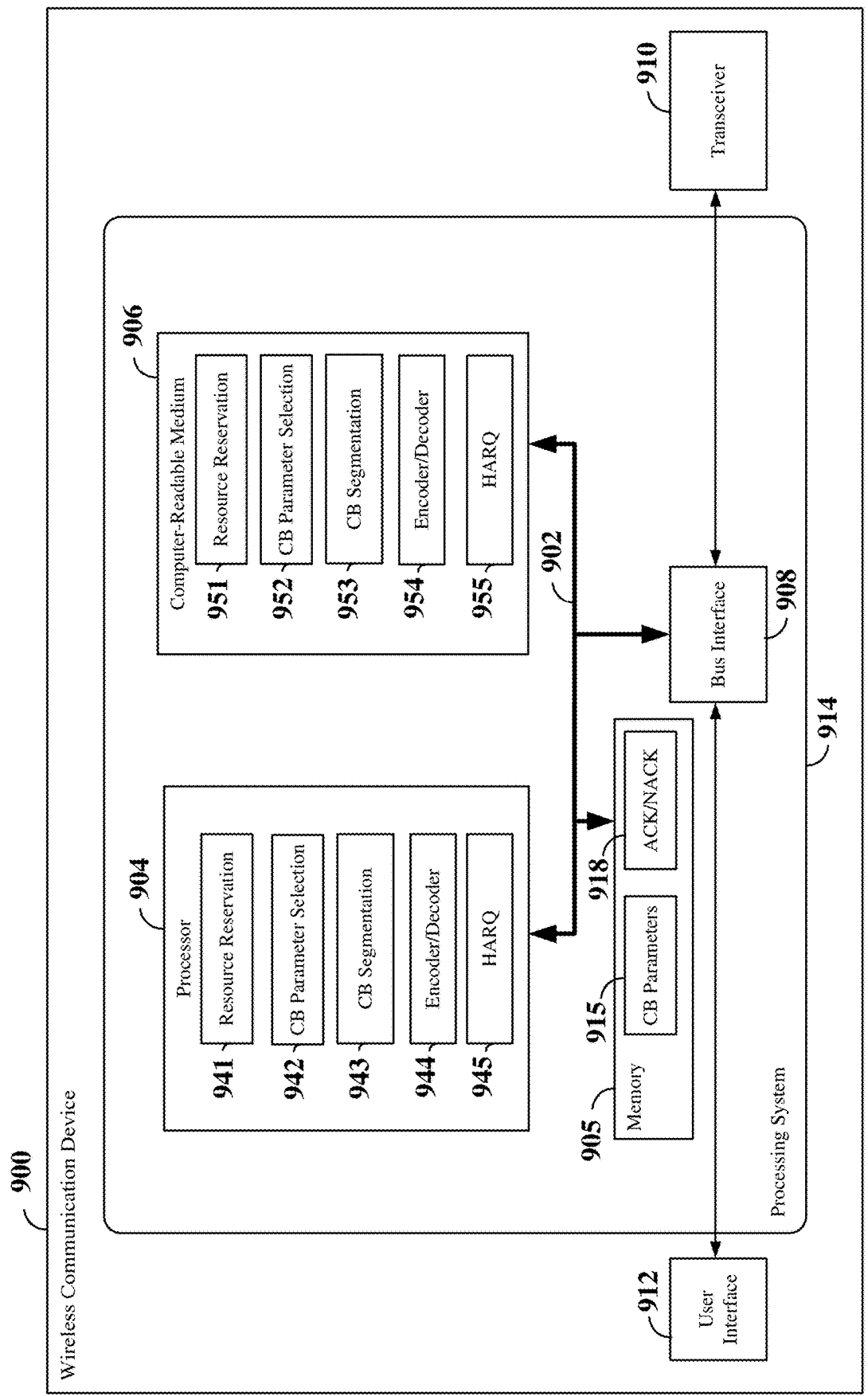
FIG. 9 is a diagram illustrating an example of a hardware implementation for a wireless communication device employing a processing system according to some aspects.

FIG. 9 is a block diagram illustrating an example of a hardware implementation for a wireless communication device 900 employing a processing system 914. For example, the wireless communication device 900 may correspond to a UE, as shown and described above in reference to FIGS. 1 and/or 2. In some examples, the wireless communication device 900 may be a sidelink device.

The wireless communication device 900 may be implemented with a processing system 914 that includes one or more processors 904. Examples of processors 904 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 900 may be configured to perform any one or more of the functions described herein. That is, the processor 904, as utilized in the wireless communication device 900, may be used to implement any one or more of the processes and procedures described below.

In this example, the processing system 914 may be implemented with a bus architecture, represented generally by the bus 902. The bus 902 may include any number of interconnecting buses and bridges depending on the specific application of the processing system 914 and the overall design constraints. The bus 902 links together various circuits including one or more processors (represented generally by the processor 904), a memory 905, and computer-readable media (represented generally by the computer-readable medium 906). The bus 902 may also link various other circuits such as timing sources, peripherals, voltage regulators, and power management circuits, which are well known in the art, and therefore, will not be described any further.

A bus interface 908 provides an interface between the bus 902 and a transceiver 910. The transceiver 910 provides a means for communicating with various other apparatus over a transmission medium (e.g., air interface). Depending upon the nature of the apparatus, a user interface 912 (e.g., keypad, display, touch screen, speaker, microphone, control knobs, etc.) may also be provided. Of course, such a user interface 912 is optional, and may be omitted in some examples.

The processor 904 is responsible for managing the bus 902 and general processing, including the execution of software stored on the computer-readable medium 906. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software, when executed by the processor 904, causes the processing system 914 to perform the various functions described below for any particular apparatus. The computer-readable medium 906 and the memory 905 may also be used for storing data that is manipulated by the processor 904 when executing software.

The computer-readable medium 906 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 906 may reside in the processing system 914, external to the processing system 914, or distributed across multiple entities including the processing system 914. The computer-readable medium 906 may be embodied in a computer program product. By way of example, a computer program product may include a computer-readable medium in packaging materials. In some examples, the computer-readable medium 906 may be part of the memory 905. Those skilled in the art will recognize how best to implement the described functionality presented throughout this disclosure depending on the particular application and the overall design constraints imposed on the overall system.

In some aspects of the disclosure, the processor 904 may include circuitry configured for various functions. For example, the processor 904 may include resource reservation circuitry 941, which may, in some examples, correspond to the resource reservation circuitry 706 shown in FIG. 7. The resource reservation circuitry 941 may be configured to reserve resources across two or more slots for transmission of a transport block (TB) including a packet. The resource reservation circuitry 941 is further configured to generate resource parameters indicating, for example, the number of slots included in the reserved resources, along with an amount of available resources (e.g., the number of available symbols or REs) in each slot for transmission of the TB. The resource reservation circuitry 941 may further be configured to execute resource reservation software 951 stored on the computer-readable medium 906 to implement one or more functions described herein.

The processor 904 may further include CB parameter selection circuitry 942, which may, in some examples, correspond to the CB parameter selection circuitry 710 shown in FIG. 7 or the CB parameter selection circuitry 806 shown in FIG. 8. In examples in which the wireless communication device 900 is a transmitting or receiving sidelink device, the CB parameter selection circuitry 942 may be configured to select CB parameters 915 for segmenting the TB into a plurality of CBs (or received encoded CBs). The CB parameters 915 may indicate, for example, the number of encoded CBs and the size of each encoded CB. The CB parameters 915 may be selected based on at least the TBS of the TB and the resource parameters. In examples in which the wireless communication device 900 is a receiving sidelink device, the CB parameter selection circuitry 842 may further be configured to determine the TB S of the TB based on the MCS and resource parameters indicated by control information transmitted from the transmitting sidelink device. The CB parameters 915 may further be stored, for example, in memory 905. The CB parameter selection circuitry 942 may further be configured to execute CB parameter selection software 952 stored on the computer-readable medium 906 to implement one or more of the functions herein.

The processor 904 may further include CB segmentation circuitry 943, which may, in some examples, correspond to the CB segmentation circuitry 714 shown in FIG. 7 or the CB segmentation circuitry 810 shown in FIG. 8. The CB segmentation circuitry 943 may be configured to segment a TB into a plurality of CBs (or received encoded CBs) based on the CB parameters 815. The CB segmentation circuitry 943 may further be configured to execute CB segmentation software 953 stored on the computer-readable medium 906 to implement one or more of the functions described herein.

The processor 904 may further include an encoder/decoder 944, which may, in some examples, correspond to the encoder 716 shown in FIG. 7 and/or the decoder 812 shown in FIG. 8. In examples in which the wireless communication device 900 is a transmitting sidelink device, the encoder/decoder 944 may be configured to encode each of the plurality of CBs to produce the plurality of encoded CBs. The encoder/decoder 944 may further be configured to perform rate-matching on the plurality of encoded code blocks such that the encoded code blocks are rate-matched encoded code blocks. In examples in which the wireless communication device 900 is a receiving sidelink device, the encoder/decoder 944 may be configured to decode each of the plurality of encoded CBs to produce the original packet. In some examples, the encoder/decoder 944 is an LDPC encoder/decoder. The encoder/decoder 944 may further be configured to execute encoder/decoder software 954 stored on the computer-readable medium to implement one or more of the functions herein.

The processor 904 may further include hybrid automatic repeat request (HARQ) circuitry 945, configured to implement a HARQ process for the TB. For example, the HARQ circuitry 945 may be configured to implement chase-combining HARQ (HARQ-CC) or incremental redundancy HARQ (HARQ-IR). In HARQ-CC, a retransmitted CB is identical to the original transmission of the CB. That is, if a CB is not decoded properly at the receiving sidelink device, resulting in a NACK, then the transmitting sidelink device may retransmit the full CB including identical information to the original transmission. The information may then ideally be obtained error-free by virtue of a process called soft combining, where the redundant bits from the retransmission may be combined before decoding to increase the probability of correct reception of each bit. On the other hand, in HARQ-IR, the retransmitted encoded code block may be different from the originally transmitted encoded code block, and further, if multiple retransmissions are made, each retransmission may differ from one another.

Here, retransmissions may include different sets of coded bits: for example, corresponding to different code rates or algorithms; corresponding to different portions of the original code block, some of which may not have been transmitted in the original transmission; corresponding to forward error correction (FEC) bits that were not transmitted in the original transmission; or other suitable schemes. As with HARQ-CC, here, the information may be obtained error-free by utilizing soft combining to combine the retransmitted bits with the original transmitted bits.

In examples in which the wireless communication device 900 is a receiving sidelink device, the HARQ circuitry 945 may be configured to generate acknowledgement information containing one or more acknowledgements/negative acknowledgements (ACK/NACKs) 918 associated with the TB and transmit the acknowledgement information to the transmitting sidelink device. The ACK/NACKs 918 may be stored, for example, in memory 905. In some examples, the HARQ circuitry 945 may generate a respective ACK/NACK 918 for each of the CBs in the TB. In other examples, the HARQ circuitry 945 may be configured to generate a respective ACK/NACK 918 for each slot in the resources reserved for the TB. In this example, if a NACK is received for a specific slot, the NACK indicates that at least one CB transmitted in that slot was not successfully received/decoded.

In examples in which the wireless communication device 900 is a transmitting sidelink device, the HARQ circuitry 945 may be configured to receive acknowledgement information from a receiving sidelink device. In some examples, the acknowledgement information may include a respective ACK/NACK 918 for each CB in the TB. In other examples, the acknowledgement information may include a respective ACK/NACK 918 for each slot containing one or more CBs of the TB. If the acknowledgement information includes a separate ACK/NACK 918 for each CB, the HARQ circuitry 945 may generate and transmit a retransmitted encoded code block (e.g., using HARQ-CC or HARQ-IR) corresponding to each CB for which a NACK is received. In the control information for the retransmission, the transmitting wireless communication device 900 may indicate (implicitly or explicitly) an identifier of the CB, so that the receiving sidelink device may properly combine the received CB retransmission with the original CB transmission using soft-combining.

If the acknowledgement information includes a separate NACK for each slot, the HARQ circuitry 945 may generate and transmit a retransmitted encoded code block (e.g., using HARQ-CC or HARQ-IR) corresponding to each CB in a particular slot for which a NACK is received. In the control information for the retransmission, the transmitting wireless communication device 900 may indicate (implicitly or explicitly) an identifier of the original slot for which the NACK was received, so that the receiving sidelink device may properly combine the received CB retransmission(s) with the original CB transmission(s) using soft-combining. The HARQ circuitry 945 may further be configured to execute HARQ software 955 stored on the computer-readable medium to implement one or more of the functions herein.

Figure 10:
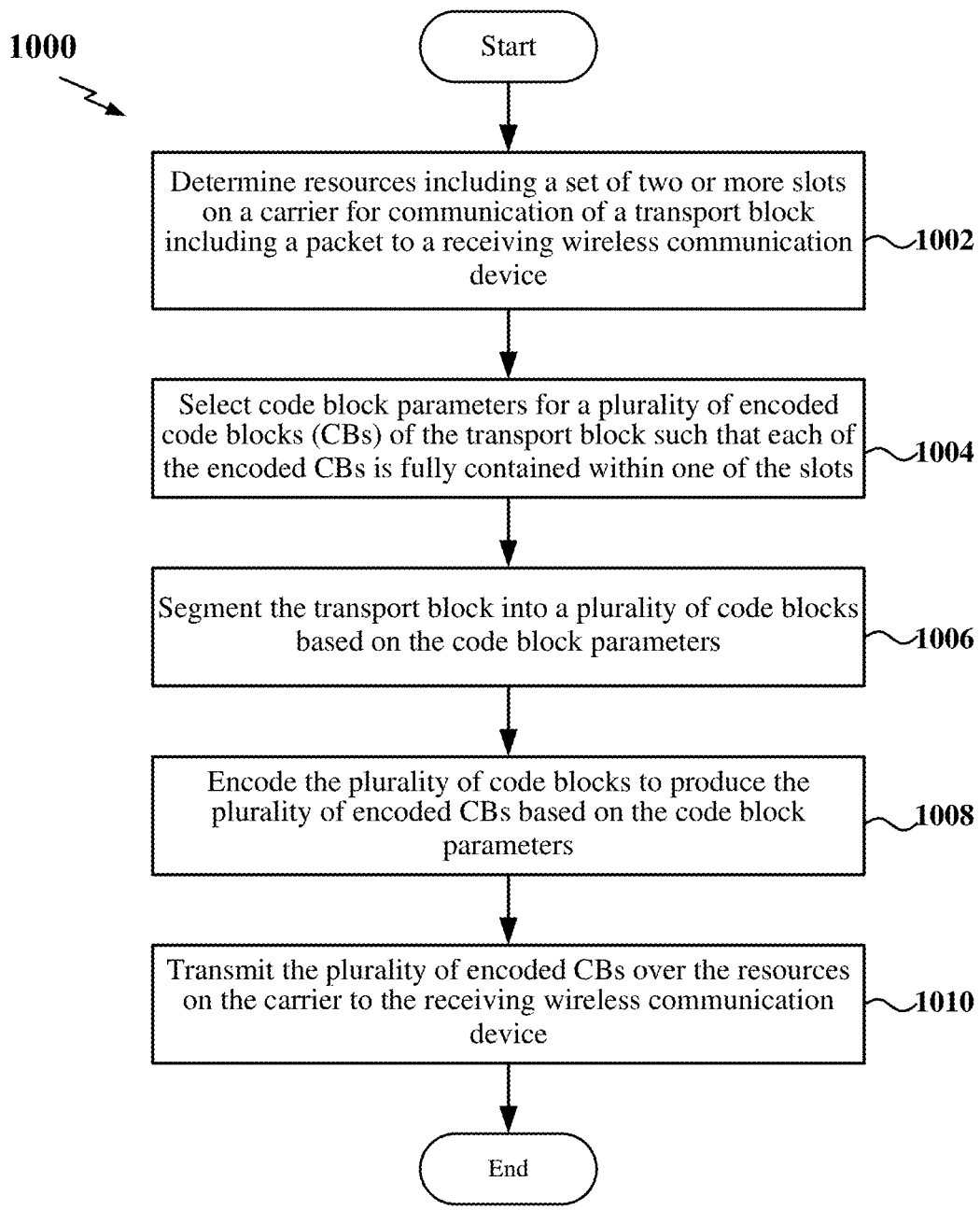
FIG. 10 is a flow chart of an exemplary method of wireless communication over a carrier using single-slot CB segmentation for TB slot aggregation according to some aspects.

FIG. 10 is a flow chart 1000 of a method for wireless communication over a carrier using single-slot CB segmentation for TB slot aggregation. As described below, some or all illustrated features may be omitted in a particular implementation within the scope of the present disclosure, and some illustrated features may not be required for implementation of all embodiments. In some examples, the method may be performed by the wireless communication device 900, which may be a transmitting wireless communication device (e.g., a transmitting sidelink device), as described above and illustrated in FIG. 9, by a processor or processing system, or by any suitable means for carrying out the described functions.

At block 1002, the transmitting wireless communication device may determine resources on a carrier (e.g., the sidelink carrier) for communication of a TB including a packet to a receiving wireless communication device. In some examples, the resources may include a set of two or more slots. For example, the resource reservation circuitry 941 and/or the CB parameter selection circuitry 942 shown and described above in connection with FIG. 9 may determine the resources.

At block 1004, the transmitting wireless communication device may select CB parameters associated with a plurality of encoded CBs of the TB such that each of the encoded CBs is fully contained within a respective one of the slots. In some examples, the CB parameters may indicate the number of encoded CBs and the respective size of each of the encoded CBs. In some examples, the CB parameters may be selected based on the TBS of the TB, the number of slots within the reserved resources and the amount of available resources (e.g., number of available symbols or REs) available for transmission of the TB within the reserved resources.

In some examples, the CB parameters may be selected based on a respective number of bits of the transport block to be transmitted in each respective slot of the set of two or more of the plurality of slots and a predefined rule. For example, the respective number bits of the transport block to be transmitted in each slot may be calculated as a respective product of a code rate, a modulation order, and a respective number of the available resource elements within the respective slot. As another example, the respective number of bits of the transport block to be transmitted in each slot may be calculated as a ratio of the transport block size of the transport block to the number of slots within the set of two or more of the plurality of slots. For example, the CB parameter selection circuitry 942 shown and described above in connection with FIG. 9 may select the CB parameters for the TB.

At block 1006, the transmitting wireless communication device may segment the TB into a plurality of CBs (prior to encoding) based on the CB parameters. For example, the CB segmentation circuitry 943 shown and described above in connection with FIG. 9 may segment the TB into the plurality of CBs.

At block 1008, the transmitting wireless communication device may encode the plurality of CBs to produce the plurality of encoded CBs based on the CB parameters. Here, each CB may be separately encoded to produce one of the encoded CBs. In some examples, the CBs may be encoded using an LDPC coding scheme. For example, the encoder/decoder 944 shown and described above in connection with FIG. 9 may encode the CBs to produce the plurality of encoded CBs.

At block 1010, the transmitting wireless communication device may transmit the plurality of encoded CBs over the resources on the carrier to the receiving wireless communication device. For example, the transceiver 910, shown and described above in connection with FIG. 9 may transmit the encoded CBs to the receiving wireless communication device.

Figure 11:
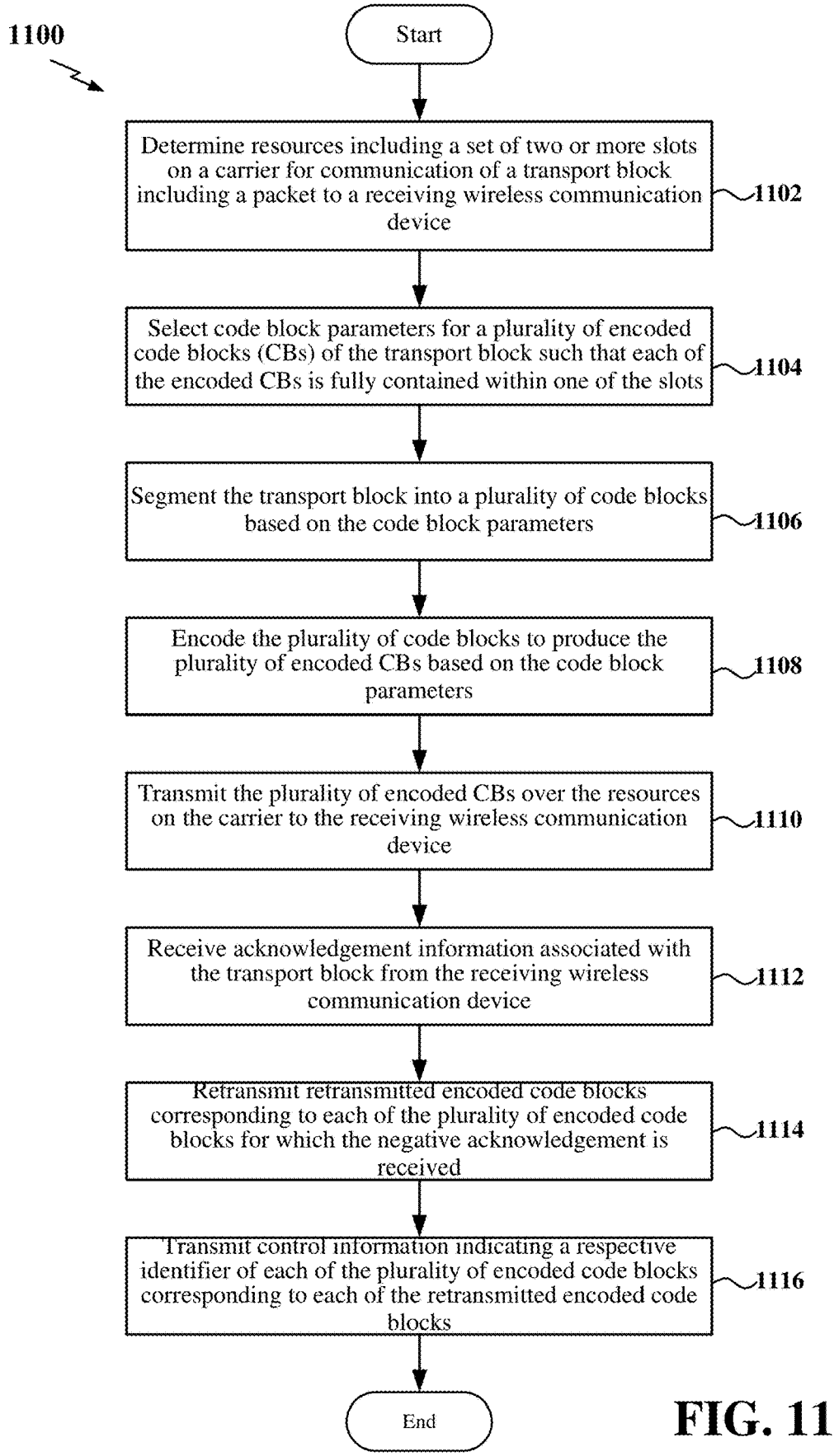
FIG. 11 is a flow chart of another exemplary method of wireless communication over a carrier using single-slot CB segmentation for TB slot aggregation according to some aspects.

FIG. 11 is a flow chart 1100 of a method for wireless communication over a carrier using single-slot CB segmentation for TB slot aggregation. As described below, some or all illustrated features may be omitted in a particular implementation within the scope of the present disclosure, and some illustrated features may not be required for implementation of all embodiments. In some examples, the method may be performed by the wireless communication device 900, which may be a transmitting wireless communication device (e.g., a transmitting sidelink device), as described above and illustrated in FIG. 9, by a processor or processing system, or by any suitable means for carrying out the described functions.

At block 1102, the transmitting wireless communication device may determine resources on a carrier (e.g., the sidelink carrier) for communication of a TB including a packet to a receiving wireless communication device. In some examples, the resources may include a set of two or more slots. For example, the resource reservation circuitry 941 and/or the CB parameter selection circuitry 942 shown and described above in connection with FIG. 9 may determine the resources.

At block 1104, the transmitting wireless communication device may select CB parameters associated with a plurality of encoded CBs of the TB such that each of the encoded CBs is fully contained within a respective one of the slots. In some examples, the CB parameters may indicate the number of encoded CBs and the respective size of each of the encoded CBs. In some examples, the CB parameters may be selected based on the TBS of the TB, the number of slots within the reserved resources and the amount of available resources (e.g., number of available symbols or REs) available for transmission of the TB within the reserved resources.

In some examples, the CB parameters may be selected based on a respective number of bits of the transport block to be transmitted in each respective slot of the set of two or more of the plurality of slots and a predefined rule. For example, the respective number bits of the transport block to be transmitted in each slot may be calculated as a respective product of a code rate, a modulation order, and a respective number of the available resource elements within the respective slot. As another example, the respective number of bits of the transport block to be transmitted in each slot may be calculated as a ratio of the transport block size of the transport block to the number of slots within the set of two or more of the plurality of slots. For example, the CB parameter selection circuitry 942 shown and described above in connection with FIG. 9 may select the CB parameters for the TB.

At block 1106, the transmitting wireless communication device may segment the TB into a plurality of CBs (prior to encoding) based on the CB parameters. For example, the CB segmentation circuitry 943 shown and described above in connection with FIG. 9 may segment the TB into the plurality of CBs.

At block 1108, the transmitting wireless communication device may encode the plurality of CBs to produce the plurality of encoded CBs based on the CB parameters. Here, each CB may be separately encoded to produce one of the encoded CBs. In some examples, the CBs may be encoded using an LDPC coding scheme. For example, the encoder/decoder 944 shown and described above in connection with FIG. 9 may encode the CBs to produce the plurality of encoded CBs.

At block 1110, the transmitting wireless communication device may transmit the plurality of encoded CBs over the resources on the carrier to the receiving wireless communication device. For example, the transceiver 910, shown and described above in connection with FIG. 9 may transmit the encoded CBs to the receiving wireless communication device.

At block 1112, the transmitting wireless communication device may receive acknowledgement information associated with the transport block from the receiving wireless communication device. In some examples, the acknowledgement information includes a respective acknowledgement or negative acknowledgement for each of the plurality of encoded code blocks. For example, the HARQ circuitry 945, together with the transceiver 910, shown and described above in connection with FIG. 9 may receive the acknowledgement information.

At block 1114, the transmitting wireless communication device may retransmit retransmitted encoded code blocks corresponding to each of the plurality of encoded code blocks for which the negative acknowledgement is received. For example, the HARQ circuitry 945, together with the transceiver 910, shown and described above in connection with FIG. 9 may retransmit retransmitted encoded code blocks.

At block 1116, the transmitting wireless communication device may transmit control information to the receiving wireless communication device indicating a respective identifier of each of the plurality of encoded code blocks corresponding to each of the retransmitted encoded code blocks. For example, the HARQ circuitry 945, together with the transceiver 910, shown and described above in connection with FIG. 9 may transmit the control information.

Figure 12:
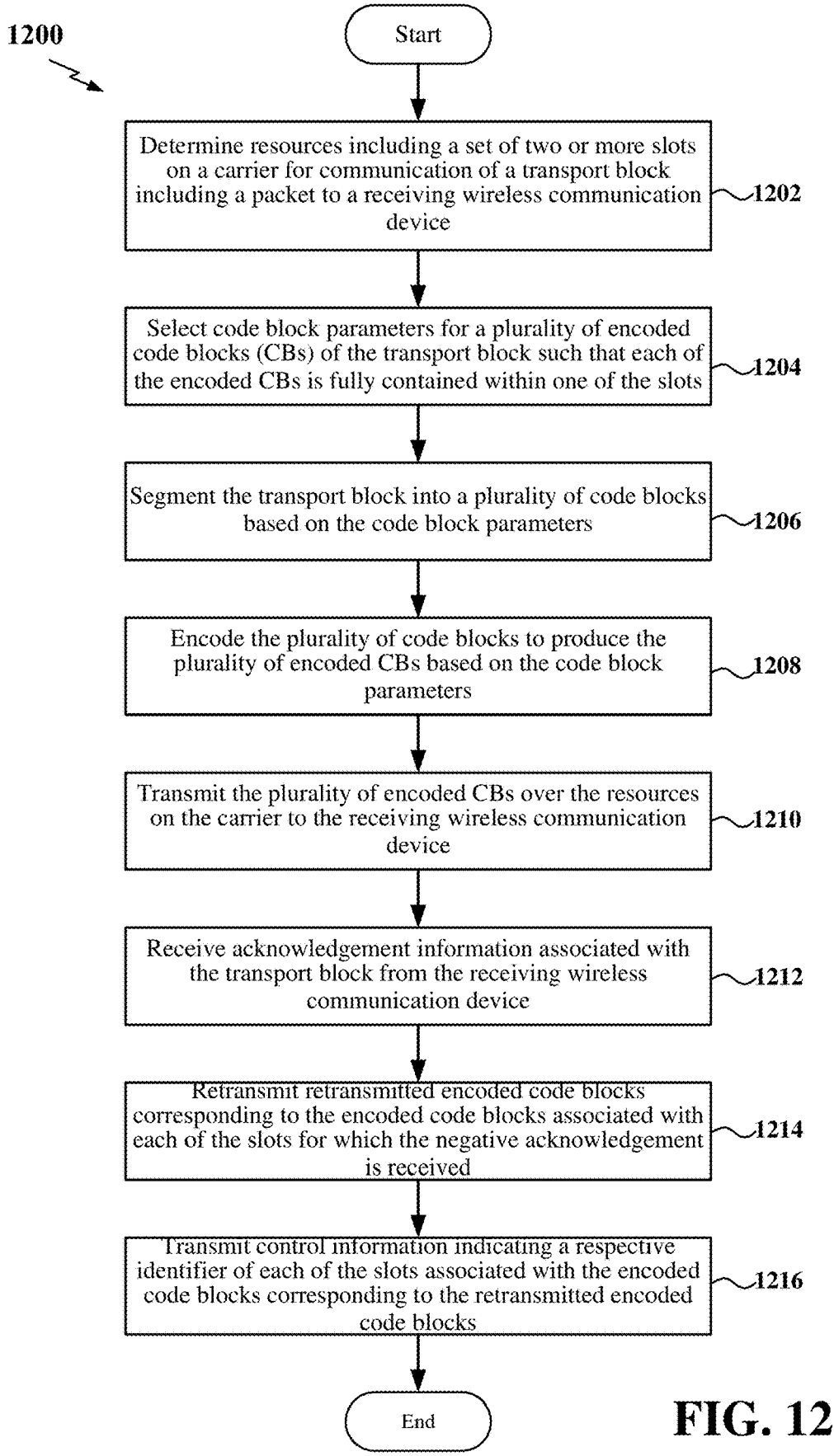
FIG. 12 is a flow chart of another exemplary method of wireless communication over a carrier using single-slot CB segmentation for TB slot aggregation according to some aspects.

FIG. 12 is a flow chart 1200 of a method for wireless communication over a carrier using single-slot CB segmentation for TB slot aggregation. As described below, some or all illustrated features may be omitted in a particular implementation within the scope of the present disclosure, and some illustrated features may not be required for implementation of all embodiments. In some examples, the method may be performed by the wireless communication device 900, which may be a transmitting wireless communication device (e.g., a transmitting sidelink device), as described above and illustrated in FIG. 9, by a processor or processing system, or by any suitable means for carrying out the described functions.

At block 1202, the transmitting wireless communication device may determine resources on a carrier (e.g., the sidelink carrier) for communication of a TB including a packet to a receiving wireless communication device. In some examples, the resources may include a set of two or more slots. For example, the resource reservation circuitry 941 and/or the CB parameter selection circuitry 942 shown and described above in connection with FIG. 9 may determine the resources.

At block 1204, the transmitting wireless communication device may select CB parameters associated with a plurality of encoded CBs of the TB such that each of the encoded CBs is fully contained within a respective one of the slots. In some examples, the CB parameters may indicate the number of encoded CBs and the respective size of each of the encoded CBs. In some examples, the CB parameters may be selected based on the TBS of the TB, the number of slots within the reserved resources and the amount of available resources (e.g., number of available symbols or REs) available for transmission of the TB within the reserved resources.

In some examples, the CB parameters may be selected based on a respective number of bits of the transport block to be transmitted in each respective slot of the set of two or more of the plurality of slots and a predefined rule. For example, the respective number bits of the transport block to be transmitted in each slot may be calculated as a respective product of a code rate, a modulation order, and a respective number of the available resource elements within the respective slot. As another example, the respective number of bits of the transport block to be transmitted in each slot may be calculated as a ratio of the transport block size of the transport block to the number of slots within the set of two or more of the plurality of slots. For example, the CB parameter selection circuitry 942 shown and described above in connection with FIG. 9 may select the CB parameters for the TB.

At block 1206, the transmitting wireless communication device may segment the TB into a plurality of CBs (prior to encoding) based on the CB parameters. For example, the CB segmentation circuitry 943 shown and described above in connection with FIG. 9 may segment the TB into the plurality of CBs.

At block 1208, the transmitting wireless communication device may encode the plurality of CBs to produce the plurality of encoded CBs based on the CB parameters. Here, each CB may be separately encoded to produce one of the encoded CBs. In some examples, the CBs may be encoded using an LDPC coding scheme. For example, the encoder/decoder 944 shown and described above in connection with FIG. 9 may encode the CBs to produce the plurality of encoded CBs.

At block 1210, the transmitting wireless communication device may transmit the plurality of encoded CBs over the resources on the carrier to the receiving wireless communication device. For example, the transceiver 910, shown and described above in connection with FIG. 9 may transmit the encoded CBs to the receiving wireless communication device.

At block 1212, the transmitting wireless communication device may receive acknowledgement information associated with the transport block from the receiving wireless communication device. In some examples, the acknowledgement information includes a respective acknowledgement or negative acknowledgement for each of the slots. For example, the HARQ circuitry 945, together with the transceiver 910, shown and described above in connection with FIG. 9 may receive the acknowledgement information.

At block 1214, the transmitting wireless communication device may retransmit retransmitted encoded code blocks corresponding to the encoded code blocks associated with each of the slots for which the negative acknowledgement is received. For example, the HARQ circuitry 945, together with the transceiver 910, shown and described above in connection with FIG. 9 may retransmit retransmitted encoded code blocks.

At block 1216, the transmitting wireless communication device may transmit control information to the receiving wireless communication device indicating a respective identifier of each of the slots associated with the encoded code blocks corresponding to the retransmitted encoded code blocks. For example, the HARQ circuitry 945, together with the transceiver 910, shown and described above in connection with FIG. 9 may transmit the control information.

Figure 13:
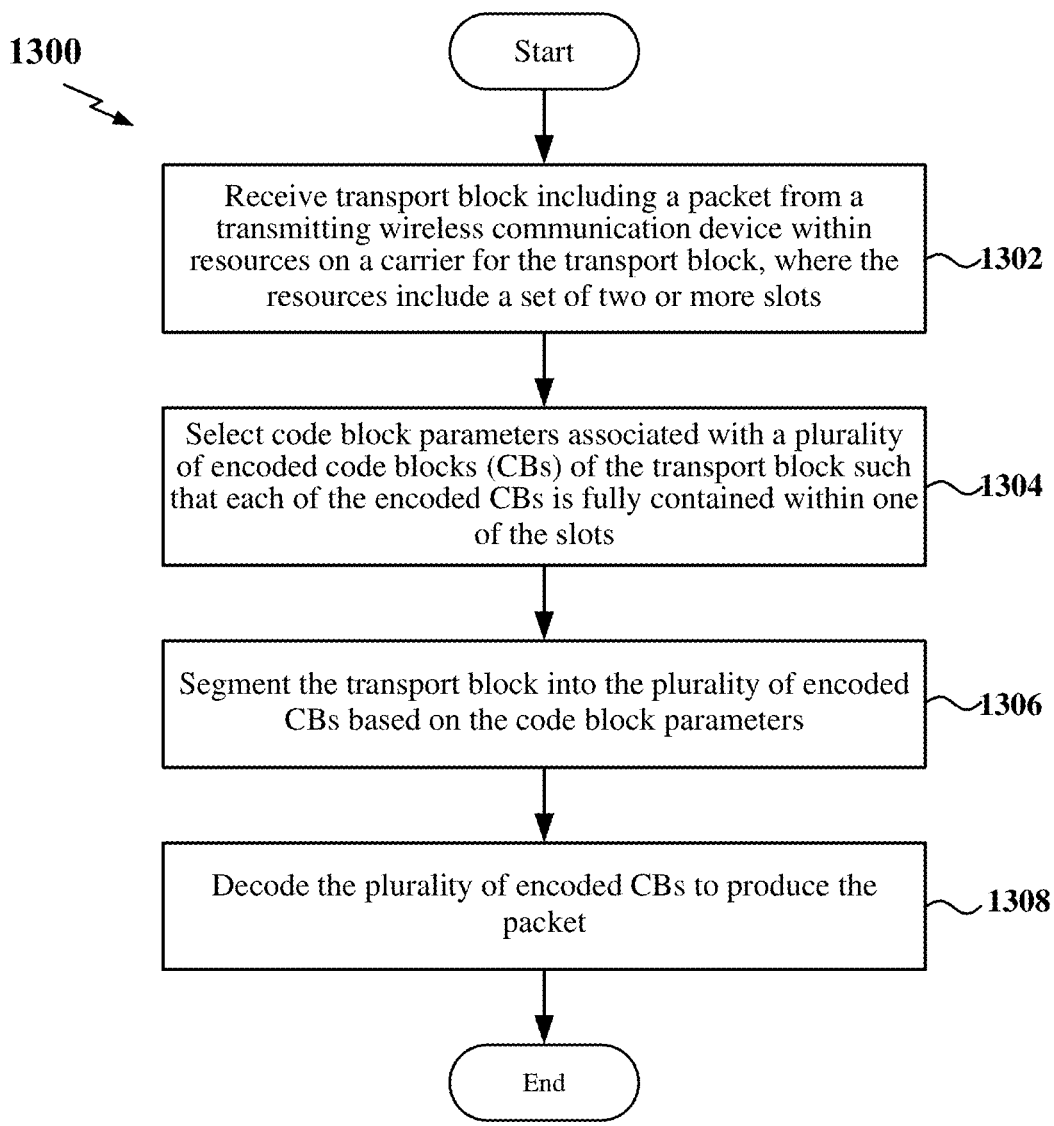
FIG. 13 is a flow chart of another exemplary method of wireless communication over a carrier using single-slot CB segmentation for TB slot aggregation according to some aspects.

FIG. 13 is a flow chart 1300 of another method for wireless communication over a carrier using single-slot CB segmentation for TB slot aggregation. As described below, some or all illustrated features may be omitted in a particular implementation within the scope of the present disclosure, and some illustrated features may not be required for implementation of all embodiments. In some examples, the method may be performed by the wireless communication device 900, which may be a receiving wireless communication device (e.g., a receiving sidelink device), as described above and illustrated in FIG. 9, by a processor or processing system, or by any suitable means for carrying out the described functions.

At block 1302, the receiving wireless communication device may receive a TB including a packet transmitted from a transmitting wireless communication device over a carrier (e.g., a sidelink carrier). The TB may be received within resources over a set of two or more slots. For example, the transceiver 910, shown and described above in connection with FIG. 9 may receive the encoded TB.

At block 1304, the receiving wireless communication device may select CB parameters associated with a plurality of encoded CBs of the TB such that each of the encoded CBs is fully contained within a respective one of the slots. In some examples, the CB parameters may indicate the number of encoded CBs and the respective size of each of the encoded CBs. In some examples, the CB parameters may be selected based on the TBS of the TB (e.g., as determined from the MCS and amount of available resources available for reception of the TB in the reserved resources), the number of slots within the reserved resources and the amount of available resources.

In some examples, the CB parameters may be selected based on a respective number of bits of the transport block to be transmitted in each respective slot of the set of two or more of the plurality of slots and a predefined rule. For example, the respective number bits of the transport block to be transmitted in each slot may be calculated as a respective product of a code rate, a modulation order, and a respective number of the available resource elements within the respective slot. As another example, the respective number of bits of the transport block to be transmitted in each slot may be calculated as a ratio of the transport block size of the transport block to the number of slots within the set of two or more of the plurality of slots. For example, the CB parameter selection circuitry 942 shown and described above in connection with FIG. 9 may select the CB parameters for the encoded TB.

At block 1306, the receiving wireless communication device may segment the TB into a plurality of encoded CBs based on the CB parameters. For example, the CB segmentation circuitry 943 shown and described above in connection with FIG. 9 may segment the TB into the plurality of encoded CBs.

At block 1308, the receiving wireless communication device may decode the plurality of encoded CBs to produce the original packet. In some examples, the encoded CBs may be decoded using an LDPC coding scheme. For example, the encoder/decoder 944 shown and described above in connection with FIG. 9 may decode the encoded CBs to produce the original packet.

Figure 14:
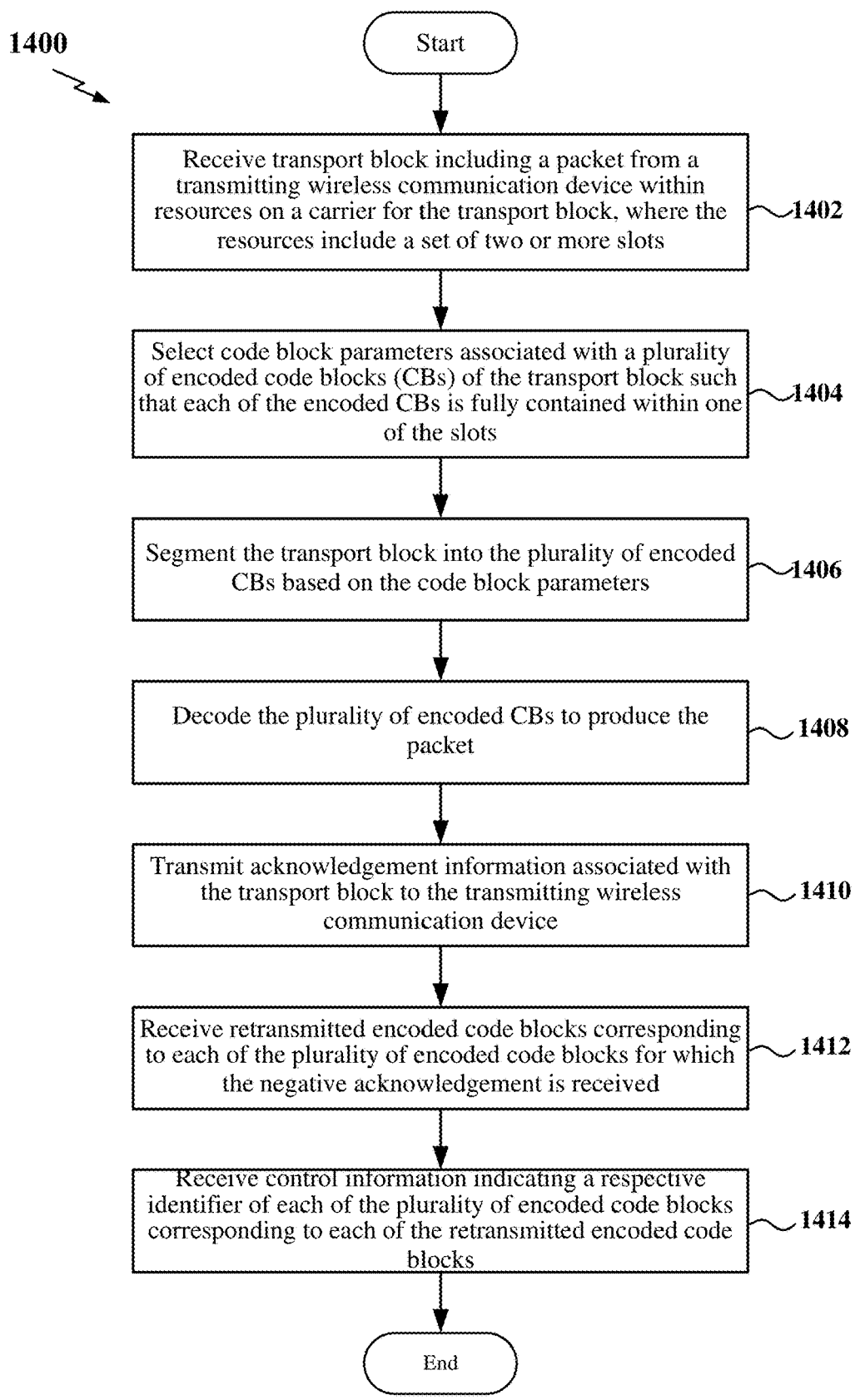
FIG. 14 is a flow chart of another exemplary method of wireless communication over a carrier using single-slot CB segmentation for TB slot aggregation according to some aspects.

FIG. 14 is a flow chart 1400 of another method for wireless communication over a carrier using single-slot CB segmentation for TB slot aggregation. As described below, some or all illustrated features may be omitted in a particular implementation within the scope of the present disclosure, and some illustrated features may not be required for implementation of all embodiments. In some examples, the method may be performed by the wireless communication device 900, which may be a receiving wireless communication device (e.g., a receiving sidelink device), as described above and illustrated in FIG. 9, by a processor or processing system, or by any suitable means for carrying out the described functions.

At block 1402, the receiving wireless communication device may receive a TB including a packet transmitted from a transmitting wireless communication device over a carrier (e.g., a sidelink carrier). The TB may be received within resources over a set of two or more slots. For example, the transceiver 910, shown and described above in connection with FIG. 9 may receive the encoded TB.

At block 1404, the receiving wireless communication device may select CB parameters associated with a plurality of encoded CBs of the TB such that each of the encoded CBs is fully contained within a respective one of the slots. In some examples, the CB parameters may indicate the number of encoded CBs and the respective size of each of the encoded CBs. In some examples, the CB parameters may be selected based on the TBS of the TB (e.g., as determined from the MCS and amount of available resources available for reception of the TB in the reserved resources), the number of slots within the reserved resources and the amount of available resources.

In some examples, the CB parameters may be selected based on a respective number of bits of the transport block to be transmitted in each respective slot of the set of two or more of the plurality of slots and a predefined rule. For example, the respective number bits of the transport block to be transmitted in each slot may be calculated as a respective product of a code rate, a modulation order, and a respective number of the available resource elements within the respective slot. As another example, the respective number of bits of the transport block to be transmitted in each slot may be calculated as a ratio of the transport block size of the transport block to the number of slots within the set of two or more of the plurality of slots. For example, the CB parameter selection circuitry 942 shown and described above in connection with FIG. 9 may select the CB parameters for the encoded TB.

At block 1406, the receiving wireless communication device may segment the TB into a plurality of encoded CBs based on the CB parameters. For example, the CB segmentation circuitry 943 shown and described above in connection with FIG. 9 may segment the TB into the plurality of encoded CBs.

At block 1408, the receiving wireless communication device may decode the plurality of encoded CBs to produce the original packet. In some examples, the encoded CBs may be decoded using an LDPC coding scheme. For example, the encoder/decoder 944 shown and described above in connection with FIG. 9 may decode the encoded CBs to produce the original packet.

At block 1410, the receiving wireless communication device may transmit acknowledgement information associated with the transport block to the transmitting wireless communication device. In some examples, the acknowledgement information includes a respective acknowledgement or negative acknowledgement for each of the plurality of encoded code blocks. For example, the HARQ circuitry 945, together with the transceiver 910, shown and described above in connection with FIG. 9 may transmit the acknowledgement information.

At block 1412, the receiving wireless communication device may receive retransmitted encoded code blocks corresponding to each of the plurality of encoded code blocks for which the negative acknowledgement is received. For example, the HARQ circuitry 945, together with the transceiver 910, shown and described above in connection with FIG. 9 may receive the retransmitted encoded code blocks.

At block 1414, the receiving wireless communication device may receive control information to the receiving wireless communication device indicating a respective identifier of each of the plurality of encoded code blocks corresponding to each of the retransmitted encoded code blocks. For example, the HARQ circuitry 945, together with the transceiver 910, shown and described above in connection with FIG. 9 may receive the control information.

Figure 15:
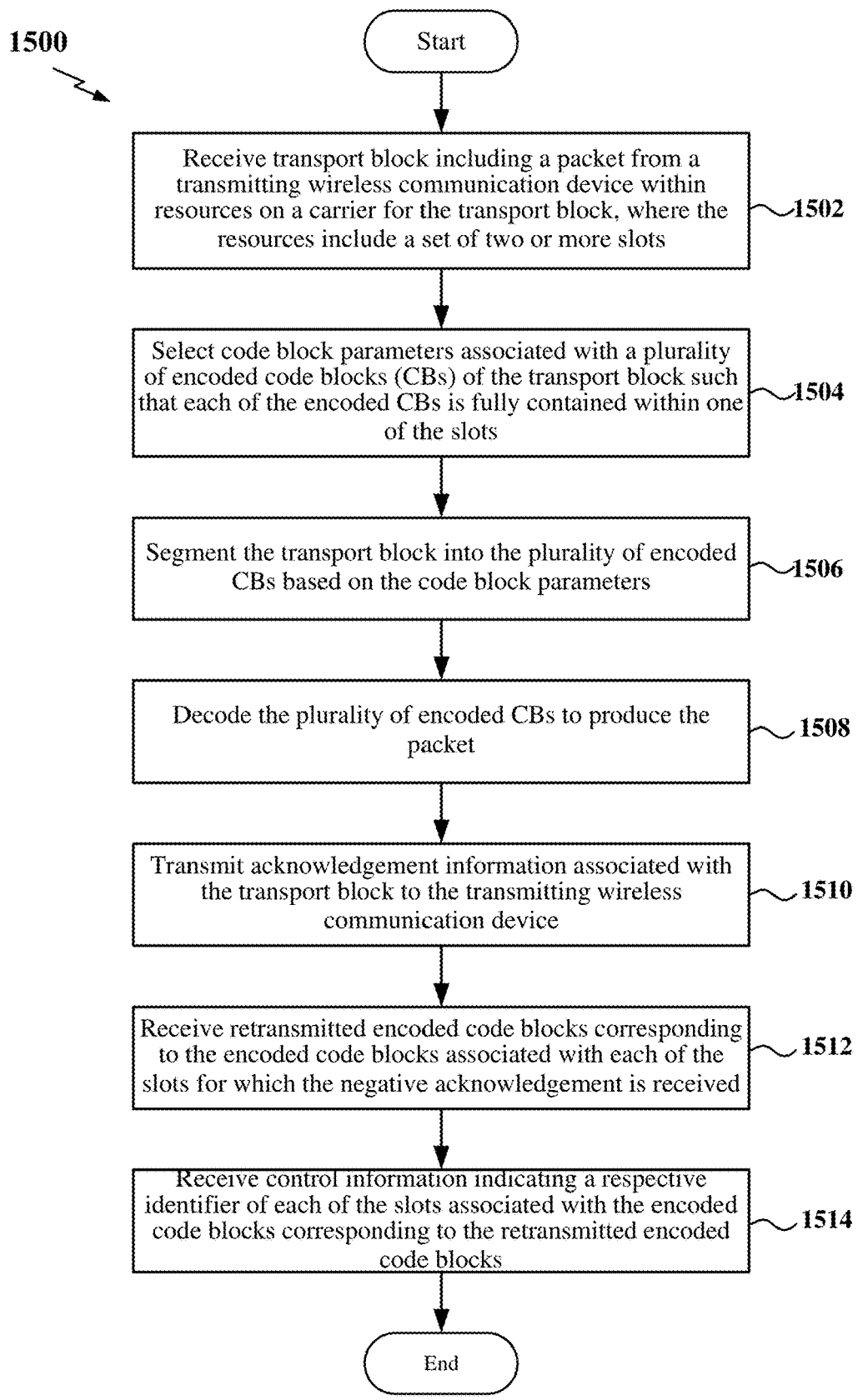
FIG. 15 is a flow chart of another exemplary method of wireless communication over a carrier using single-slot CB segmentation for TB slot aggregation according to some aspects.

FIG. 15 is a flow chart 1500 of another method for wireless communication over a carrier using single-slot CB segmentation for TB slot aggregation. As described below, some or all illustrated features may be omitted in a particular implementation within the scope of the present disclosure, and some illustrated features may not be required for implementation of all embodiments. In some examples, the method may be performed by the wireless communication device 900, which may be a receiving wireless communication device (e.g., a receiving sidelink device), as described above and illustrated in FIG. 9, by a processor or processing system, or by any suitable means for carrying out the described functions.

At block 1502, the receiving wireless communication device may receive a TB including a packet transmitted from a transmitting wireless communication device over a carrier (e.g., a sidelink carrier). The TB may be received within resources over a set of two or more slots. For example, the transceiver 910, shown and described above in connection with FIG. 9 may receive the encoded TB.

At block 1504, the receiving wireless communication device may select CB parameters associated with a plurality of encoded CBs of the TB such that each of the encoded CBs is fully contained within a respective one of the slots. In some examples, the CB parameters may indicate the number of encoded CBs and the respective size of each of the encoded CBs. In some examples, the CB parameters may be selected based on the TBS of the TB (e.g., as determined from the MCS and amount of available resources available for reception of the TB in the reserved resources), the number of slots within the reserved resources and the amount of available resources.

In some examples, the CB parameters may be selected based on a respective number of bits of the transport block to be transmitted in each respective slot of the set of two or more of the plurality of slots and a predefined rule. For example, the respective number bits of the transport block to be transmitted in each slot may be calculated as a respective product of a code rate, a modulation order, and a respective number of the available resource elements within the respective slot. As another example, the respective number of bits of the transport block to be transmitted in each slot may be calculated as a ratio of the transport block size of the transport block to the number of slots within the set of two or more of the plurality of slots. For example, the CB parameter selection circuitry 942 shown and described above in connection with FIG. 9 may select the CB parameters for the encoded TB.

At block 1506, the receiving wireless communication device may segment the TB into a plurality of encoded CBs based on the CB parameters. For example, the CB segmentation circuitry 943 shown and described above in connection with FIG. 9 may segment the TB into the plurality of encoded CBs.

At block 1508, the receiving wireless communication device may decode the plurality of encoded CBs to produce the original packet. In some examples, the encoded CBs may be decoded using an LDPC coding scheme. For example, the encoder/decoder 944 shown and described above in connection with FIG. 9 may decode the encoded CBs to produce the original packet.

At block 1510, the receiving wireless communication device may transmit acknowledgement information associated with the transport block to the transmitting wireless communication device. In some examples, the acknowledgement information includes a respective acknowledgement or negative acknowledgement for each of the slots. For example, the HARQ circuitry 945, together with the transceiver 910, shown and described above in connection with FIG. 9 may transmit the acknowledgement information.

At block 1512, the receiving wireless communication device may receive retransmitted encoded code blocks corresponding to the encoded code blocks associated with each of the slots for which the negative acknowledgement is received. For example, the HARQ circuitry 945, together with the transceiver 910, shown and described above in connection with FIG. 9 may receive the retransmitted encoded code blocks.

At block 1514, the receiving wireless communication device may receive control information to the receiving wireless communication device indicating a respective identifier of each of the slots associated with the encoded code blocks corresponding to the retransmitted encoded code blocks. For example, the HARQ circuitry 945, together with the transceiver 910, shown and described above in connection with FIG. 9 may receive the control information.

In one configuration, the wireless communication device 900 includes means for single-slot CB segmentation for TB slot aggregation as described in the present disclosure. In one aspect, the aforementioned means may be the processor 904 shown in FIG. 9 configured to perform the functions recited by the aforementioned means. In another aspect, the aforementioned means may be a circuit or any apparatus configured to perform the functions recited by the aforementioned means.

Of course, in the above examples, the circuitry included in the processor 904 is merely provided as an example, and other means for carrying out the described functions may be included within various aspects of the present disclosure, including but not limited to the instructions stored in the computer-readable storage medium 906, or any other suitable apparatus or means described in any one of the FIGS. 1, 2, 4, 7 and/or 8, and utilizing, for example, the processes and/or algorithms described herein in relation to FIGS. 10-15.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-11 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 4, and/or 7-9 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of wireless communication at a first wireless communication device, the method comprising:
   determining resources on a carrier for communication of a transport block comprising a packet to a second wireless communication device, wherein the carrier is time-divided into a plurality of slots, wherein the resources comprise a set of two or more of the plurality of slots;
   identifying available resource elements within the resources that are available for transmission of the transport block;
   selecting code block parameters associated with a plurality of encoded code blocks of the transport block based on the available resource elements such that each of the plurality of encoded code blocks is fully contained within a respective slot of the set of two or more of the plurality of slots, wherein the code block parameters comprise a number of the plurality of encoded code blocks and a respective code block size of each of the plurality of encoded code blocks;
   segmenting the transport block into a plurality of code blocks based on the code block parameters;
   encoding the plurality of code blocks to produce the plurality of encoded code blocks based on the code block parameters; and
   transmitting the plurality of encoded code blocks over the resources on the carrier to the second wireless communication device.

2. The method of claim 1, wherein the selecting the code block parameters associated with the plurality of encoded code blocks of the transport block further comprises:
   determining a transport block size of the transport block;
   determining a number of slots within the set of two or more of the plurality of slots; and
   selecting the code block parameters based on the transport block size, the number of slots, and the available resource elements.

3. The method of claim 2, wherein the determining the transport block size of the transport block further comprises:
   determining a total number of bits available for communication of the transport block in the set of two or more of the plurality of slots based on a number of the available resource elements, a modulation and coding scheme selected for communication of the transport block, and a number of transmission streams selected for communication of the transport block; and
   determining the transport block size based on the total number of bits.

4. The method of claim 2, wherein the selecting the code block parameters based on the transport block size, the number of slots, and the available resource elements further comprises:
   identifying a respective number of bits of the transport block to be transmitted in each respective slot of the set of two or more of the plurality of slots; and
   selecting the code block parameters based on the respective number of bits to be transmitted in each respective slot of the set of two or more of the plurality of slots and a predefined rule.

5. The method of claim 4, wherein the identifying the respective number of bits to be transmitted in each respective slot of the set of two or more of the plurality of slots further comprises:
   calculating the respective number of bits of the transport block to be transmitted in each respective slot of the set of two or more of the plurality of slots as a respective product of a code rate, a modulation order, and a respective number of the available resource elements within the respective slot.

6. The method of claim 4, wherein the identifying the respective number of bits to be transmitted in each respective slot of the set of two or more of the plurality of slots further comprises:
   calculating the respective number of bits of the transport block to be transmitted in each respective slot of the set of two or more of the plurality of slots as a ratio of the transport block size of the transport block to the number of slots within the set of two or more of the plurality of slots.

7. The method of claim 1, further comprising:
   receiving acknowledgement information associated with the transport block from the second wireless communication device.

8. The method of claim 7, wherein the acknowledgement information comprises a respective acknowledgement or negative acknowledgement for each of the plurality of encoded code blocks, and further comprising:
   retransmitting retransmitted encoded code blocks corresponding to each of the plurality of encoded code blocks for which the negative acknowledgement is received; and
   transmitting control information indicating a respective identifier of each of the plurality of encoded code blocks corresponding to each of the retransmitted encoded code blocks.

9. The method of claim 7, wherein the acknowledgement information comprises a respective acknowledgement or negative acknowledgement for each slot of the set of two or more of the plurality of slots, each slot of the set of two or more of the plurality of slots comprising at least one of the plurality of encoded code blocks, and further comprising:
   retransmitting retransmitted encoded code blocks corresponding to the respective at least one of the plurality of encoded code blocks associated with each of the slots of the set of two or more of the plurality of slots for which the negative acknowledgement is received; and
   transmitting control information indicating a respective identifier of each of the slots of the set of two or more of the plurality of slots associated with the respective at least one of the plurality of encoded code blocks corresponding to the retransmitted encoded code blocks.

10. The method of claim 1, wherein each slot of the set of two more of the plurality of slots comprises at least one of the plurality of encoded code blocks.

11. The method of claim 1, further comprising:
    reserving the resources on the carrier for communication of the transport block based on a packet size of the packet and a modulation and coding scheme selected for communication of the transport block.

12. The method of claim 1, wherein the plurality of encoded code blocks comprise rate-matched encoded code blocks, and wherein the transmitting the plurality of encoded code blocks further comprises:
    mapping the plurality of rate-matched encoded code blocks to a plurality of modulation symbols; and
    mapping the plurality of modulation symbols to a plurality of resource blocks within the resources to transmit the plurality of modulation symbols to the second wireless communication device.

13. A first wireless communication device, comprising:
a processor;
a wireless transceiver communicatively coupled to the processor and configured to communicate over a carrier; and
a memory communicatively coupled to the processor, wherein the processor and the memory are configured to:
determine resources on a carrier for communication of a transport block comprising a packet to a second wireless communication device, wherein the carrier is time-divided into a plurality of slots, wherein the resources comprise a set of two or more of the plurality of slots;
identify available resource elements within the resources that are available for transmission of the transport block;
select code block parameters associated with a plurality of encoded code blocks of the transport block based on the available resource elements such that each of the plurality of encoded code blocks is fully contained within a respective slot of the set of two or more of the plurality of slots, wherein the code block parameters comprise a number of the plurality of encoded code blocks and a respective code block size of each of the plurality of encoded code blocks;
segment the transport block into a plurality of code blocks based on the code block parameters;
encode the plurality of code blocks to produce the plurality of encoded code blocks based on the code block parameters; and
transmit the plurality of encoded code blocks over the resources on the carrier to the second wireless communication device via the wireless transceiver.

14. The first wireless communication device of claim 13, wherein the processor and the memory are further configured to:
determine a transport block size of the transport block;
determine a number of slots within the set of two or more of the plurality of slots; and
select the code block parameters based on the transport block size, the number of slots, and the available resource elements.

15. The first wireless communication device of claim 14, wherein the processor and the memory are further configured to:
identify a respective number of bits of the transport block to be transmitted in each respective slot of the set of two or more of the plurality of slots; and
select the code block parameters based on the respective number of bits to be transmitted in each respective slot of the set of two or more of the plurality of slots and a predefined rule.

16. The first wireless communication device of claim 15, wherein the processor and the memory are further configured to:
calculate the respective number of bits of the transport block to be transmitted in each respective slot of the set of two or more of the plurality of slots as one of a respective product of a code rate, a modulation order, and a respective number of the available resource elements within the respective slot or a ratio of the transport block size of the transport block to the number of slots within the set of two or more of the plurality of slots.

17. A method of wireless communication at a first wireless communication device, the method comprising:

receiving a transport block comprising a packet transmitted from a second wireless communication device over a carrier, wherein the carrier is time-divided into a plurality of slots, wherein the transport block is received within resources over a set of two or more of the plurality of slots;
determining available resource elements within the resources for the transport block that are available for reception of the transport block;
selecting code block parameters associated with a plurality of encoded code blocks of the transport block based on the available resource elements, wherein the code block parameters comprise a number of the plurality of encoded code blocks and a respective code block size of each of the plurality of encoded code blocks such that each of the plurality of encoded code blocks is fully contained within a respective slot of the set of two or more of the plurality of slots;
segmenting the transport block into the plurality of encoded code blocks based on the code block parameters; and
decoding the plurality of encoded code blocks based on the code block parameters to produce the packet.

18. The method of claim 17, further comprising:
determining a number of slots within the set of two or more of the plurality of slots;
determining a modulation and coding scheme utilized for the transport block; and
determining a transport block size of the transport block based on the available resource elements and the modulation and coding scheme.

19. The method of claim 18, wherein the selecting the code block parameters associated with the plurality of encoded code blocks of the transport block further comprises:
selecting the code block parameters based on the transport block size, the number of slots, and the available resource elements.

20. The method of claim 19, wherein the selecting the code block parameters based on the transport block size, the number of slots, and the available resource elements further comprises:
identifying a respective number of bits of the transport block transmitted in each respective slot of the set of two or more of the plurality of slots; and
selecting the code block parameters based on the respective number of bits transmitted in each respective slot of the set of two or more of the plurality of slots and a predefined rule.

21. The method of claim 20, wherein the identifying the respective number of bits transmitted in each respective slot of the set of two or more of the plurality of slots further comprises:
calculating the respective number of bits of the transport block transmitted in each respective slot of the set of two or more of the plurality of slots as a respective product of a code rate, a modulation order, and a respective number of the available resource elements within the respective slot.

22. The method of claim 20, wherein the identifying the respective number of bits transmitted in each respective slot of the set of two or more of the plurality of slots further comprises:
calculating the respective number of bits of the transport block transmitted in each respective slot of the set of two or more of the plurality of slots as a ratio of the transport block size of the transport block to the number of slots within the set of two or more of the plurality of slots.

23. The method of claim 17, further comprising:
transmitting acknowledgement information associated with the transport block to the second wireless communication device.

24. The method of claim 23, wherein the acknowledgement information comprises a respective acknowledgement or negative acknowledgement for each of the plurality of encoded code blocks, and further comprising:
receiving retransmitted encoded code blocks corresponding to each of the plurality of encoded code blocks for which the negative acknowledgement is received; and
receiving control information indicating a respective identifier of each of the plurality of encoded code blocks corresponding to each of the retransmitted encoded code blocks.

25. The method of claim 23, wherein the acknowledgement information comprises a respective acknowledgement or negative acknowledgement for each slot of the set of two or more of the plurality of slots, each slot of the set of two or more of the plurality of slots comprising at least one of the plurality of encoded code blocks, and further comprising:
receiving retransmitted encoded code blocks corresponding to the respective at least one of the plurality of encoded code blocks associated with each of the slots of the set of two or more of the plurality of slots for which the negative acknowledgement is received; and
receiving control information indicating a respective identifier of each of the slots of the set of two or more of the plurality of slots associated with the respective at least one of the plurality of encoded code blocks corresponding to the retransmitted encoded code blocks.

26. The method of claim 17, wherein each slot of the set of two more of the plurality of slots comprises at least one of the plurality of encoded code blocks.

27. A first wireless communication device, comprising:
a processor;
a wireless transceiver communicatively coupled to the processor and configured to communicate over a carrier; and
a memory communicatively coupled to the processor, wherein the processor and the memory are configured to:
receive a transport block comprising a packet transmitted from a second wireless communication device over the carrier via the wireless transceiver, wherein the carrier is time-divided into a plurality of slots, wherein the transport block is received within resources over a set of two or more of the plurality of slots;
determine available resource elements within the resources for the transport block that are available for reception of the transport block;
select code block parameters associated with a plurality of encoded code blocks of the transport block based on the available resource elements, wherein the code block parameters comprise a number of the plurality of encoded code blocks and a respective code block size of each of the plurality of encoded code blocks such that each of the plurality of encoded code blocks is fully contained within a respective slot of the set of two or more of the plurality of slots;
segment the transport block into the plurality of encoded code blocks based on the code block parameters; and
decode the plurality of encoded code blocks based on the code block parameters to produce the packet.

28. The first wireless communication device of claim 27, wherein the processor and the memory are further configured to:
determine a number of slots within the set of two or more of the plurality of slots;
determine a modulation and coding scheme utilized for the transport block;
determine a transport block size of the transport block based on the available resource elements and the modulation and coding scheme; and
select the code block parameters based on the transport block size, the number of slots, and the available resource elements.

29. The first wireless communication device of claim 28, wherein the processor and the memory are further configured to:
determine a respective number of bits of the transport block transmitted in each respective slot of the set of two or more of the plurality of slots; and
select the code block parameters based on the respective number of bits transmitted in each respective slot of the set of two or more of the plurality of slots and a predefined rule.

30. The first wireless communication device of claim 29, wherein the processor and the memory are further configured to:
calculate the respective number of bits of the transport block transmitted in each respective slot of the set of two or more of the plurality of slots as one of a respective product of a code rate, a modulation order, and a respective number of the available resource elements within the respective slot or a ratio of the transport block size of the transport block to the number of slots within the set of two or more of the plurality of slots.

* * * * *